United States Patent
Matsuda et al.

(10) Patent No.: US 11,003,194 B2
(45) Date of Patent: May 11, 2021

(54) SERVER DEVICE, DEVICE CONTROL METHOD, AND RECORDING MEDIUM

(71) Applicant: Hitachi, Ltd., Tokyo (JP)

(72) Inventors: Tomohiro Matsuda, Tokyo (JP); Hideya Yoshiuchi, Tokyo (JP)

(73) Assignee: Hitachi, Ltd., Tokyo (JP)

(*) Notice: Subject to any disclaimer, the term of this patent is extended or adjusted under 35 U.S.C. 154(b) by 273 days.

(21) Appl. No.: 15/928,967

(22) Filed: Mar. 22, 2018

(65) Prior Publication Data
US 2019/0025855 A1  Jan. 24, 2019

(30) Foreign Application Priority Data
Jul. 20, 2017 (JP) .............................. JP2017-140606

(51) Int. Cl.
G05D 1/02 (2020.01)
G05B 19/042 (2006.01)

(52) U.S. Cl.
CPC ......... *G05D 1/0287* (2013.01); *G05B 19/042* (2013.01); *G05B 2219/34348* (2013.01); *Y10S 901/01* (2013.01)

(58) Field of Classification Search
CPC ............... G05D 1/0287; G05B 19/042; G05B 2219/34348; Y10S 901/01
See application file for complete search history.

(56) References Cited

U.S. PATENT DOCUMENTS

| | | | |
|---|---|---|---|
| 8,639,364 B2 * | 1/2014 | Stoddard | B25J 9/1669 700/14 |
| 9,832,630 B2 * | 11/2017 | Bareket | H04W 8/005 |
| RE46,776 E * | 4/2018 | Petrovykh | H04L 12/40013 |
| 10,007,890 B1 * | 6/2018 | Purwin | G06Q 10/087 |
| 10,044,851 B2 * | 8/2018 | Aaron | H04W 4/024 |
| 10,454,977 B2 * | 10/2019 | Amento | G06F 9/5072 |
| 2003/0046304 A1 * | 3/2003 | Peskin | G06Q 10/109 |
| 2016/0129592 A1 * | 5/2016 | Saboo | G05D 1/0297 700/248 |
| 2017/0072809 A1 * | 3/2017 | Sullivan | G06Q 30/0215 |
| 2018/0189683 A1 * | 7/2018 | Newman | G01C 21/3605 |
| 2018/0374020 A1 * | 12/2018 | Ahani | H04W 4/025 |
| 2019/0329412 A1 * | 10/2019 | Matsuda | B25J 9/1607 |

FOREIGN PATENT DOCUMENTS

| | | |
|---|---|---|
| JP | 2004-46706 A | 2/2004 |
| JP | 2015-32292 A | 2/2015 |
| KR | 10-2011-0072292 A | 6/2011 |

OTHER PUBLICATIONS

Japanese-language Office Action issued in Japanese Application No. 2017-140606 dated Aug. 18, 2020 with English translation (17 pages).

* cited by examiner

Primary Examiner — Nicholas Kiswanto
(74) Attorney, Agent, or Firm — Crowell & Moring LLP

(57) ABSTRACT

A distance between an autonomously mobile information processing device and an apparatus is calculated based on positional information of the information processing device and positional information of the apparatus installed in a service provision site and necessary for a service to be provided by the information processing device, and the apparatus that is available is determined based on the distance between the information processing device and the apparatus in a case where the information processing device coordinates with the apparatus to provide the service.

11 Claims, 22 Drawing Sheets

OPERATION MANAGEMENT SERVER FUNCTIONAL BLOCK DIAGRAM

APPARATUS USAGE TIME PERIOD UPDATE PROCESS

FIG. 14

SERVICE INFORMATION DB (221)

| SERVICE IDENTIFIER | OPERATION OF STATE 1 | ... | OPERATION OF STATE N | SERVICE PARAMETER 1 | ... | SERVICE PARAMETER N | ALTERNATIVE FUNCTION IDENTIFIER | OPERATION OF ALTERNATIVE STATE 1 | ... | OPERATION OF ALTERNATIVE STATE N | ALTERNATIVE SERVICE PARAMETER 1 | ... | ALTERNATIVE SERVICE PARAMETER N |
|---|---|---|---|---|---|---|---|---|---|---|---|---|---|

SERVICE STATE INFORMATION DB (222)

| CURRENTLY-PROVIDED SERVICE IDENTIFIER | SERVICE STATE | START TIME | SCHEDULED END TIME |
|---|---|---|---|

EXTERNAL APPARATUS CONTROL PROCESS

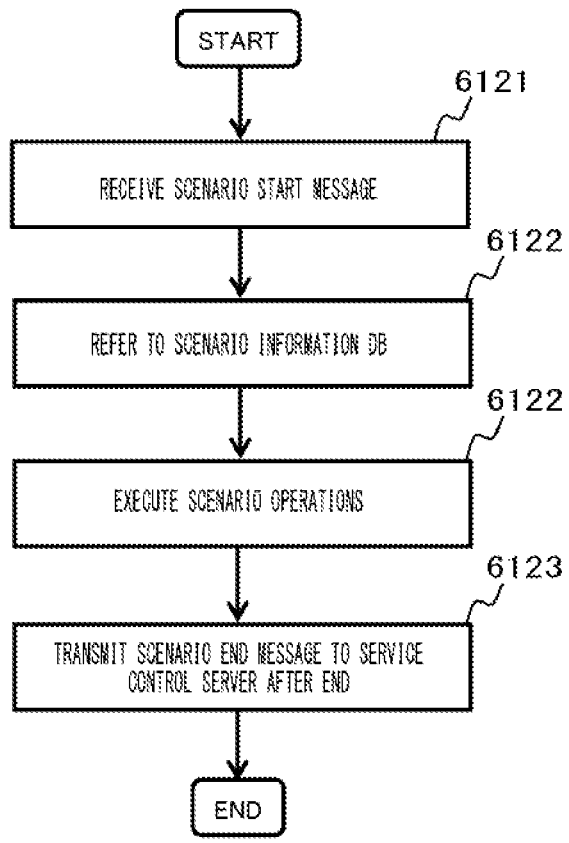

EXTERNAL APPARATUS CONTROL PROCESS

FIG. 23

| EXTERNAL APPARATUS INFORMATION DB | | | | | | | | 721 |
|---|---|---|---|---|---|---|---|---|
| APPARATUS IDENTIFIER | APPARATUS TYPE | X COORDINATE | Y COORDINATE | APPARATUS CONTROL PARAMETER 1 | ... | APPARATUS CONTROL PARAMETER N | STATE INFORMATION | |

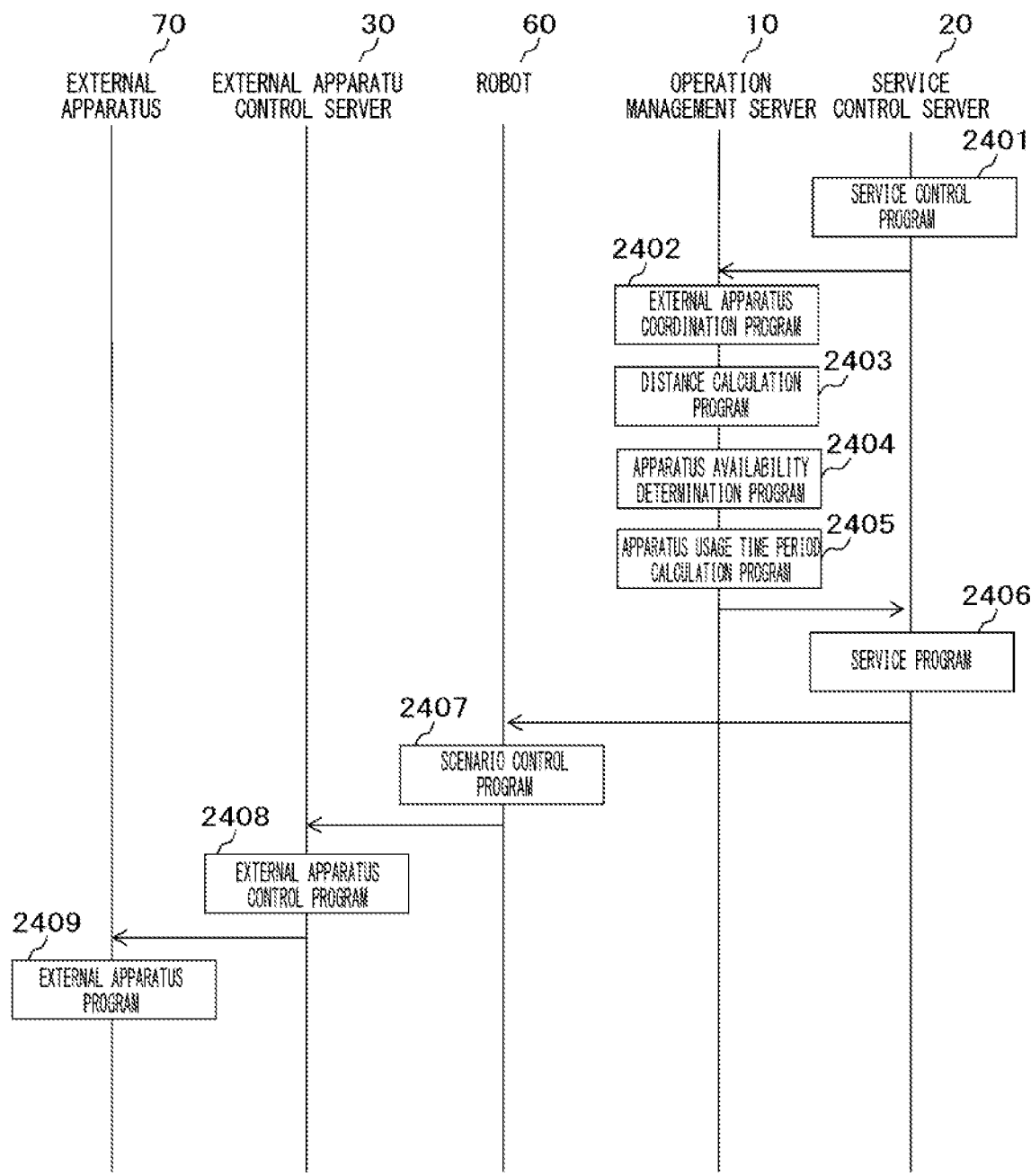

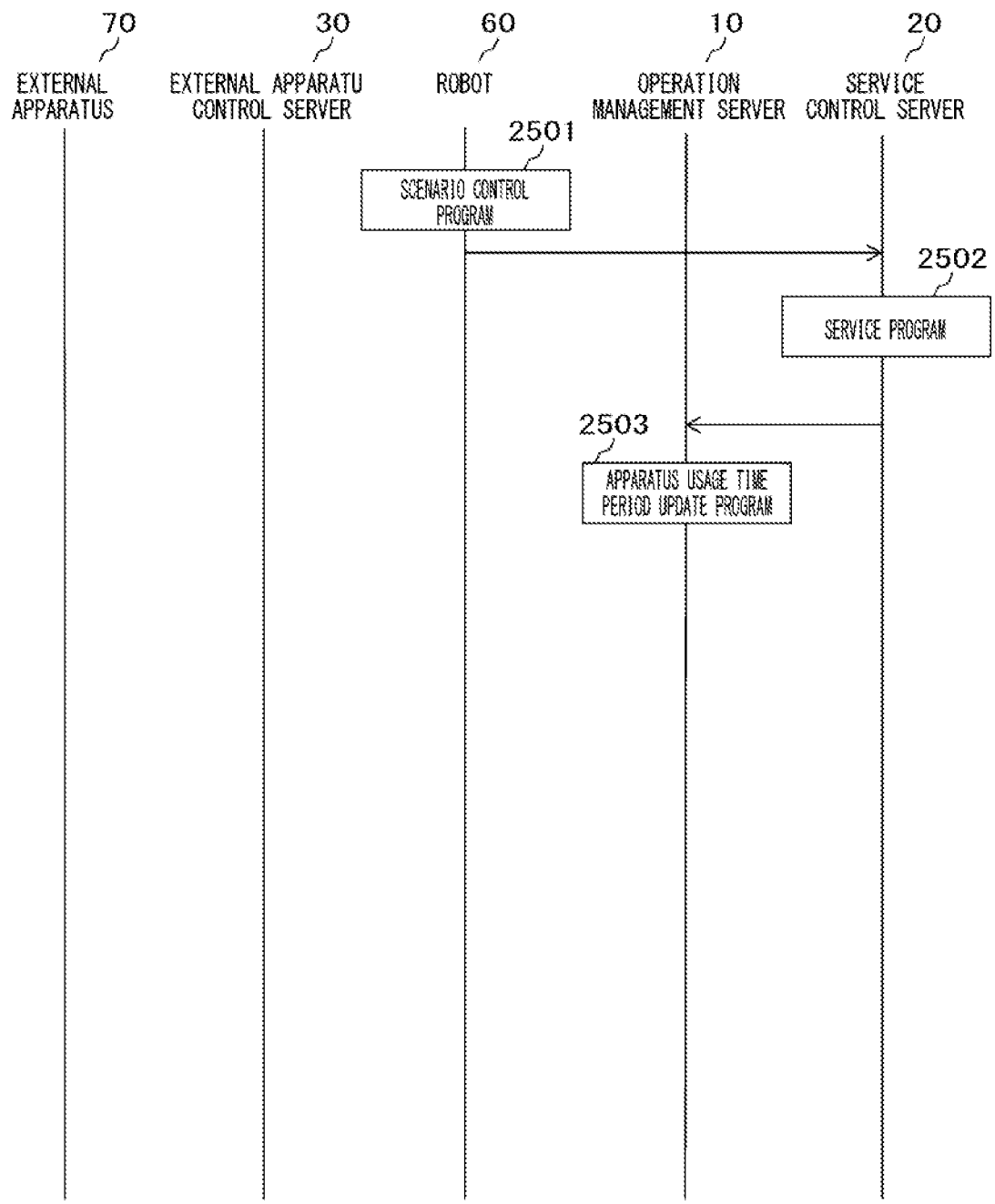

SERVER DEVICE, DEVICE CONTROL METHOD, AND RECORDING MEDIUM

CLAIM OF PRIORITY

The present application claims priority from Japanese application serial no. JP2017-140606, filed on Jul. 20, 2017, the content of which is hereby incorporated by reference into this application.

BACKGROUND

The present invention relates to a server device, a device control method, and a recording medium.

The Internet of Things (IoT) technique that connects various apparatuses to the Internet and provides various services is prevailing widely. While the number of apparatuses to be connected to the Internet is rapidly increasing, robot systems that use communication to provide various services to people have been developed. Robots have moving functions to be achieved by motors, actuators, and the like, but apparatuses to be installed in the robots are limited due to the sizes, shapes, and the like of robot bodies. For example, to install a display apparatus such as a large display in a robot, the size of the robot needs to be large and the size and position of the display to be installed are limited. Thus, to make available an apparatus that cannot be installed in the robot within a robot system, a method for installing, outside the robot, the apparatus required to provide a service and causing the robot to control the external apparatus is considered.

Japanese Unexamined Patent Application Publication No. 2004-46706 describes a peripheral apparatus managing device that manages software resources within peripheral apparatuses such as a printing device connected to a network and includes a storage unit for storing types of software resource information indicating the software resources within the peripheral apparatuses, a first specifying unit for specifying a peripheral apparatus included in the network, a second specifying unit for specifying a peripheral apparatus included in the network, and a determining unit for determining whether a software resource within the peripheral apparatus specified by the first specifying unit is included in a software resource within the peripheral apparatus specified by the second specifying unit.

SUMMARY

When the technique described in Japanese Unexamined Patent Application Publication No. 2004-46706 is used, a peripheral apparatus that has a software resource necessary to provide a service can be selected. However, when a service such as a direct customer service or a guidance service is provided by a robot to people, it is necessary to select an available apparatus as soon as possible in consideration of not only whether apparatuses are available but also distances to the apparatuses and the states of the apparatuses and to smoothly provide the service.

The present invention aims to provide a server device, a device control method, and a recording medium, which are able to smoothly provide a service to a person.

According to an aspect of the present invention, a server device controls an autonomously mobile information processing device and includes a distance calculator and an availability determiner. The distance calculator calculates a distance between the information processing device and an apparatus based on positional information of the information processing device and positional information of the apparatus installed in a service provision site and necessary for a service to be provided by the information processing device. The availability determiner determines the apparatus that is available based on the distance between the information processing device and the apparatus in a case where the information processing device coordinates with the apparatus to provide the service.

The present invention may be regarded as a device control method to be executed by the aforementioned server device and a computer-readable recording medium.

According to the present invention, a service can be smoothly provided to a person.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 14 is a block diagram showing structures of data to be managed by the service control server;

FIG. 19 is a flowchart showing an example of a scenario control process;

FIG. 20 is a block diagram showing structures of data to be managed by a robot;

FIG. 23 is a block diagram showing the structure of data to be managed by an external apparatus;

FIG. 24 is a sequence diagram showing an example of coordination with an external apparatus; and FIG. 25 is a sequence diagram showing an example of the update of a time period to use an external apparatus.

DETAILED DESCRIPTION OF THE EMBODIMENTS

Hereinafter, an embodiment of the present invention is described in detail with reference to the accompanying drawings.

Embodiment

Figure 1:
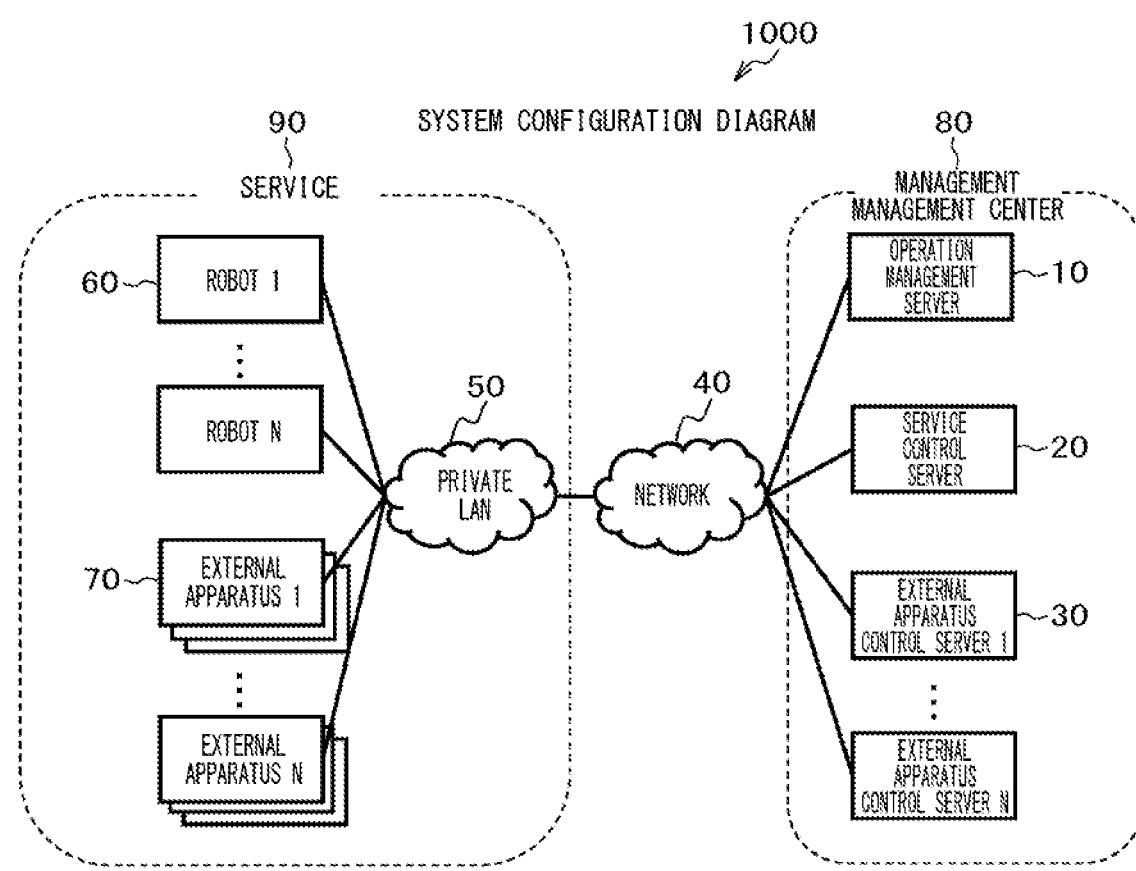
FIG. 1 is a diagram showing an example of the configuration of a robot control system according to an embodiment.

FIG. 1 is a diagram showing an example of the configuration of a mobile device-dedicated external apparatus management system 1000 according to the embodiment. The mobile device-dedicated external apparatus management system 1000 includes an operation management center 80 and a service site 90. In the operation management center 80, an operation management server 10 for operating and managing the entire system, a service control server 20 for controlling services to be provided by robots, and external apparatus control servers 30 for controlling service apparatuses are installed. In the service site 90, robots 60 that are autonomously mobile information processing devices as mobile devices, and external apparatuses 70 for executing services while coordinating with the robots 60 are installed. Although the mobile devices are described below as the robots 60 that are the autonomously mobile information processing devices, the mobile devices are not limited to the robots and include movable devices such as drones and self-driving vehicles.

The operation management center 80 and the service site 90 are connected to each other via a network 40. In addition, the robots 60 and the external apparatuses 70 are connected to each other via a private local area network (LAN) 50 within the service site 90. The private LAN 50 is, for example, a wired LAN, a wireless LAN, or a short-range wireless network and may include networks of multiple access schemes.

Figure 2:
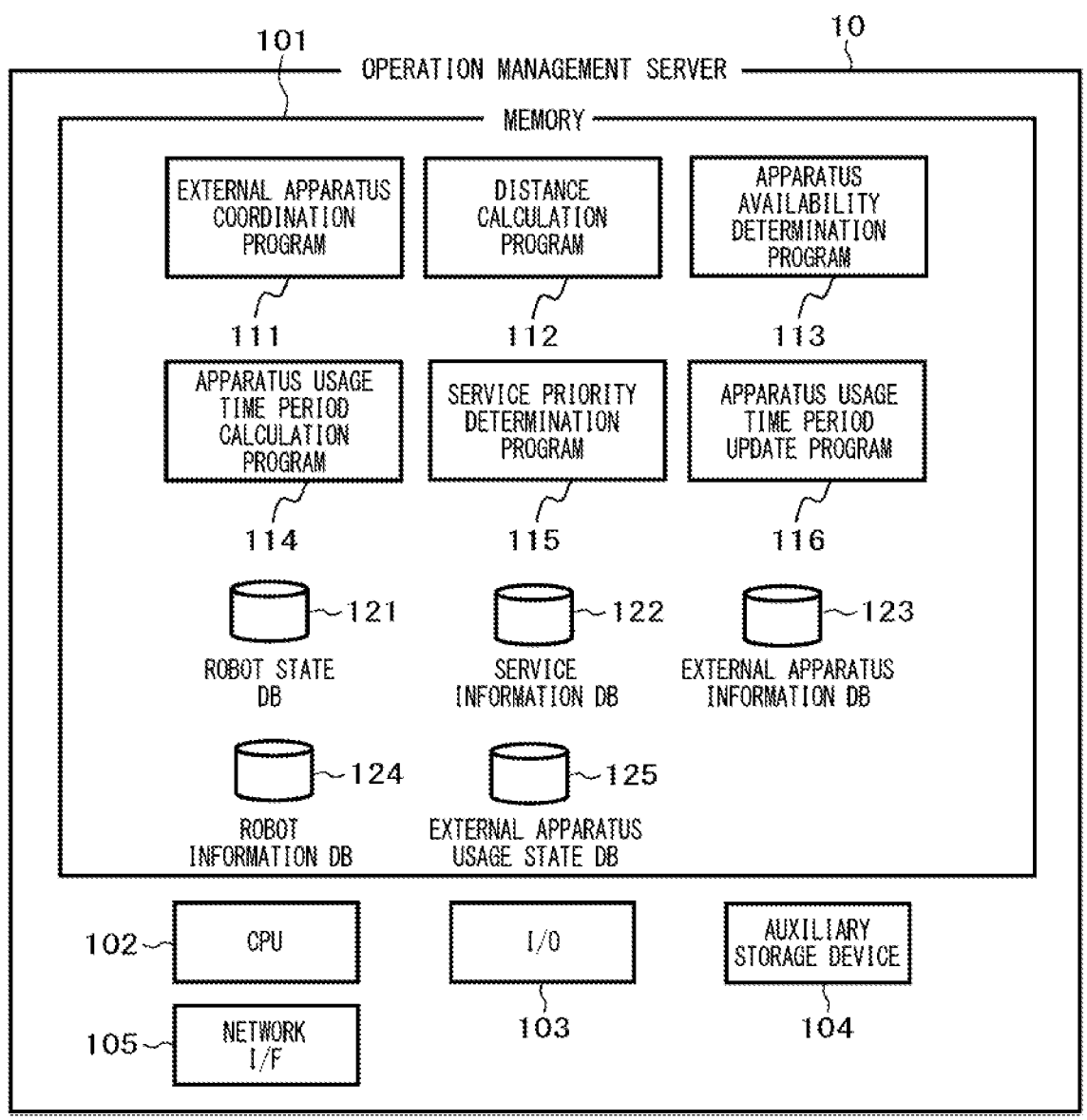
FIG. 2 is a diagram showing an example of the configuration of an operation management server.

FIG. 2 is a diagram showing an example of the configuration of the operation management server 10. In the operation management server 10, programs (software) are stored in an auxiliary storage device 104 for a general computer, and a central processing unit (CPU) 102 loads the programs read from the auxiliary storage device 104 into a memory 101 and executes the programs. The operation management server 10 communicates with another server, service devices, and the robots via a network interface (I/F) 305.

An input and output interface (I/O) 103 is a user interface that is used by a user to input an instruction to the operation management server 10 and presents the results of executing the programs and the like to the user. The I/O 103 is connected to input and output devices (for example, a keyboard, a mouse, a touch panel, a display, a printer, and the like). The I/O 103 may be connected to a user interface to be provided by a management terminal connected via the network.

The CPU 102 is a processor that executes the programs stored in the memory 101. The memory 101 includes a read only memory (ROM) that is a nonvolatile storage element and a random access memory (RAM) that is a volatile storage element. The ROM stores an unchanged program (for example, a basic input output system (BIOS)) and the like. The RAM is a high-speed volatile storage element such as a dynamic random access memory (DRAM) and temporarily stores the programs stored in the auxiliary storage device 104 and data to be used upon the execution of the programs.

Specifically, the memory 101 stores an external apparatus coordination program 111, a distance calculation program 112, an apparatus availability determination program 113, an apparatus usage time period calculation program 114, a service priority determination program 115, and an apparatus usage time period update program 116.

Figure 3:
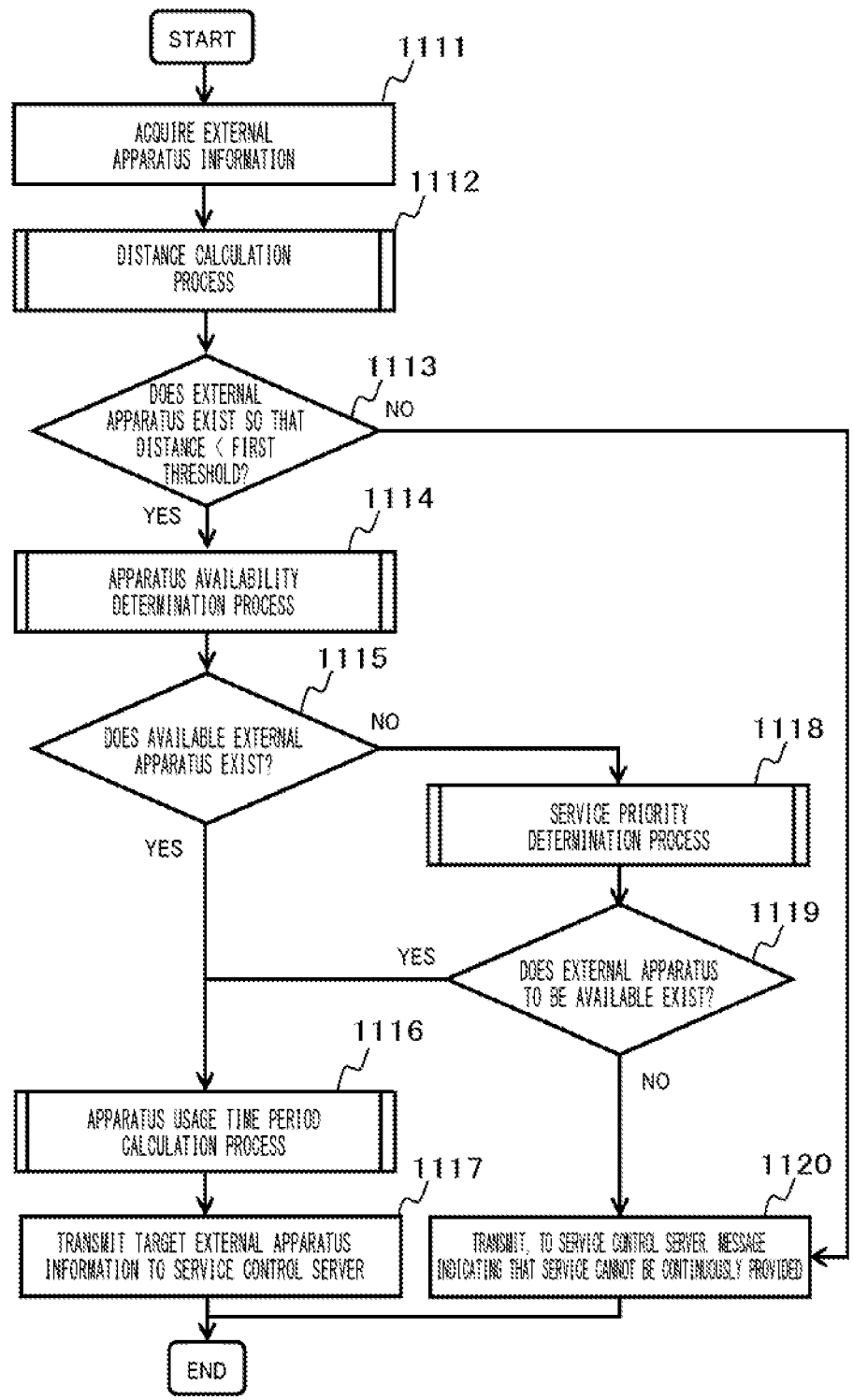
FIG. 3 is a flowchart showing an example of an external apparatus coordination process.

The external apparatus coordination program 111 is a program for executing an external apparatus coordination process (refer to FIG. 3). The distance calculation program 112 is a program for executing a distance calculation process (refer to FIG. 4). The apparatus availability determination program 113 is a program for executing an apparatus availability determination process (refer to FIG. 5). The apparatus usage time period calculation program 114 is a program executing an apparatus usage time period calculation process (refer to FIG. 6). The service priority determination program 115 is a program for executing a service priority determination process (refer to FIG. 7). The apparatus usage time period update program 116 is a program for executing an apparatus usage time period update process (refer to FIG. 8).

Figure 9:
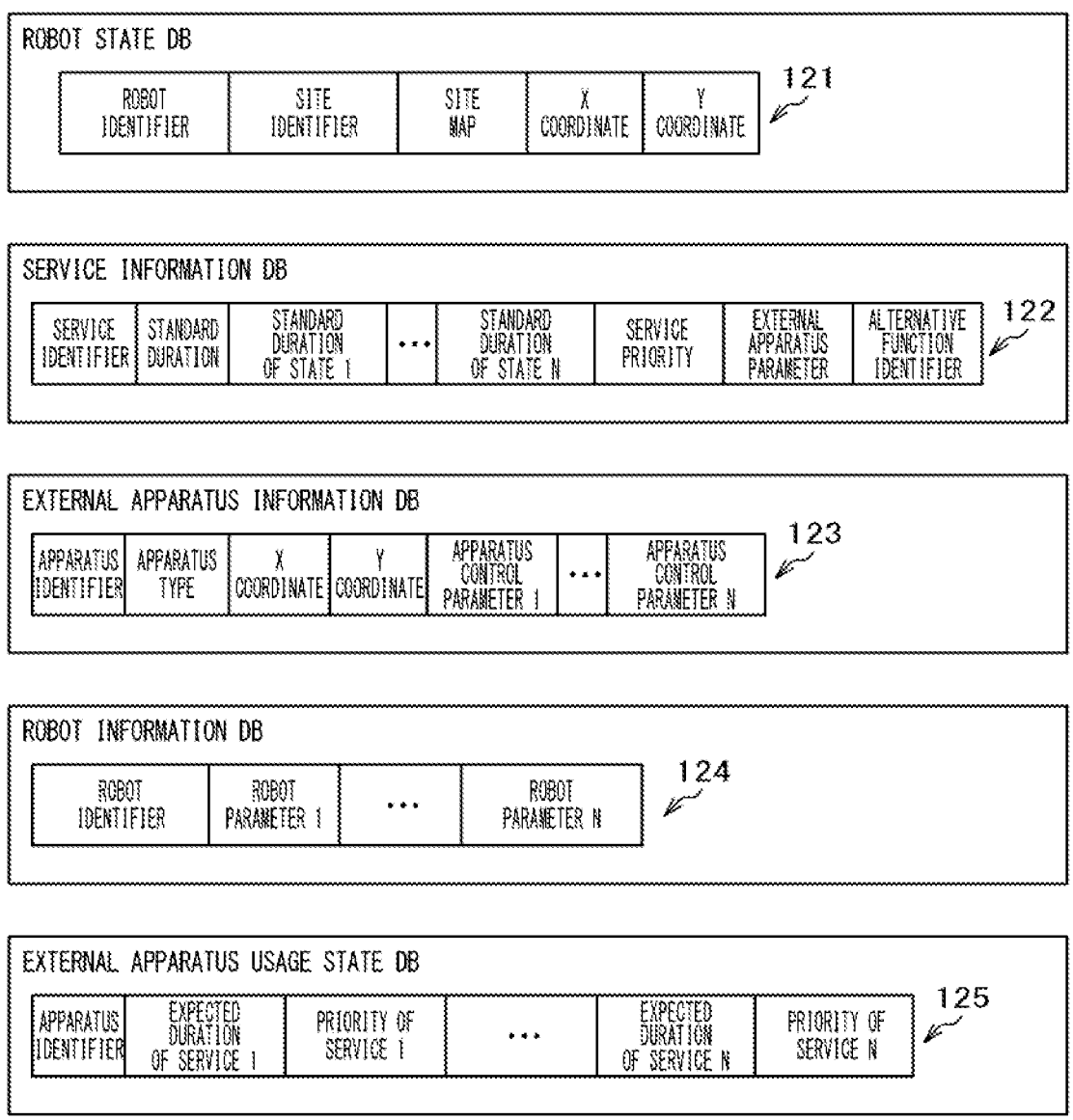
FIG. 9 is a block diagram showing structures of data to be managed by the operation management server.

The memory 101 stores a robot state DB 121 (refer to FIG. 9), a service information DB 122 (refer to FIG. 9), an external apparatus information DB 123 (refer to FIG. 9), a robot information DB 124 (refer to FIG. 9), and an external apparatus usage state DB 125 (refer to FIG. 9).

The auxiliary storage device 104 is a large-capacity nonvolatile storage device such as a magnetic storage device (hard disk drive (HDD)) or a flash memory (solid state drive (SSD)). The auxiliary storage device 104 stores the programs to be executed by the CPU 102 and the data to be used upon the execution of the programs. Specifically, the programs are read from the auxiliary storage device 104, loaded into the memory 101, and executed by the CPU 102.

The operation management server 10 is a computer system composed of a single physical computer or composed of multiple logical or physical computers. The programs stored in the memory 101 may be executed with separate threads in the same computer or may be executed in a virtual computer built in multiple physical computer resources. The operation management server 10 and another device may be installed in a single physical or logical computer. All or a part of the processes achieved by the execution of the programs may be achieved by hardware (for example, a field-programmable gate array (FPGA)).

The aforementioned programs may be installed in the ROM or the like and provided or may be recorded as an installable or executable file in a computer-readable recording medium such as a CD-ROM, a CD-R, or a digital versatile disc (DVD) and provided and distributed. The aforementioned programs may be stored in a computer connected to a network such as the Internet and may be downloaded via the network and provided and distributed.

FIG. 3 is a flowchart showing an example of the external apparatus coordination process. The external apparatus coordination process is executed by causing the CPU 102 of the operation management server 10 to execute the external apparatus coordination program 111. The external apparatus coordination program 111 is executed when the operation management server 10 acquires information indicating the start of a service requiring an external apparatus.

First, the external apparatus coordination program 111 acquires external apparatus information (FIG. 8) of the service for which a robot 60 requires an external apparatus (in step 1111). For example, upon receiving a service request to provide the service, the external apparatus coordination program 111 references the service information DB 122 (FIG. 9) using a service identifier included in the service request as a key and identifies the service to be provided. The external apparatus coordination program 111 references an external apparatus parameter associated with the service identifier of the identified service, references the external apparatus information DB 123 (FIG. 9) using, as a key, an apparatus identifier included in the external apparatus parameter and identifying an external apparatus 70, and determines the external apparatus 70 identified by the apparatus identifier as the apparatus necessary to provide the aforementioned service.

After that, the external apparatus coordination program 111 activates the distance calculation program 112, causes the distance calculation program 112 to execute the distance calculation process (refer to FIG. 4) (in step 1112), and determines whether or not the external apparatus 70 exists so that the distance between the robot 60 and the external apparatus 70 is smaller than a first threshold set in advance (in step 1113). If the external apparatus coordination program 111 determines that the external apparatus 70 does not exist so that the distance is smaller than the first threshold (No in step 1113), the external apparatus coordination program 111 transmits, to the service control server 20, an unavailability message indicating that the service to be provided is not able to be continuously provided (in step 1120), and the external apparatus coordination program 111 terminates the process.

If the external apparatus 70 exists so that the distance is smaller than the first threshold (Yes in step 1113), the external apparatus coordination program 111 activates the apparatus availability determination program 113, causes the apparatus availability determination program 113 to execute the apparatus availability determination process (refer to FIG. 5) (in step 1114), and determines whether or not an available external apparatus exists (in step 1115). If the external apparatus coordination program 111 determines that the available external apparatus exists (Yes in step 1115), the external apparatus coordination program 111 activates the apparatus usage time period calculation program 114, causes the apparatus usage time period calculation program 114 to execute the apparatus usage time period calculation process (refer to FIG. 6) (in step 1116), transmits target external apparatus information to the service control server 20 (in step 1117), and terminates the process. For example, the external apparatus coordination program 111 transmits, as the aforementioned external apparatus information to the service control server 20, an availability message in which information including the apparatus identifier and apparatus type of the available external apparatus and stored in the external apparatus information DB 123 is associated with expected service duration associated with the apparatus identifier at that time and stored in the latest external apparatus usage state DB 125.

On the other hand, if the external apparatus coordination program 111 determines that the available external apparatus 70 does not exist (No in step 1115), the external apparatus coordination program 111 activates the service priority determination program 115, causes the service priority determination program 115 to execute the service priority determination process (in step 1118), and determines whether or not an external apparatus 70 that will become available exists (in step 1119). If the external apparatus coordination program 111 determines that the external apparatus 70 that will become available exists (Yes in step 1119), the process proceeds to steps 1116 and 1117, and the external apparatus coordination program 111 terminates the process. If the external apparatus coordination program 111 determines that the external apparatus 70 that will become available does exist (No in step 1119), the process proceeds to step 1120, and the external apparatus coordination program 111 terminates the process.

Figure 4:
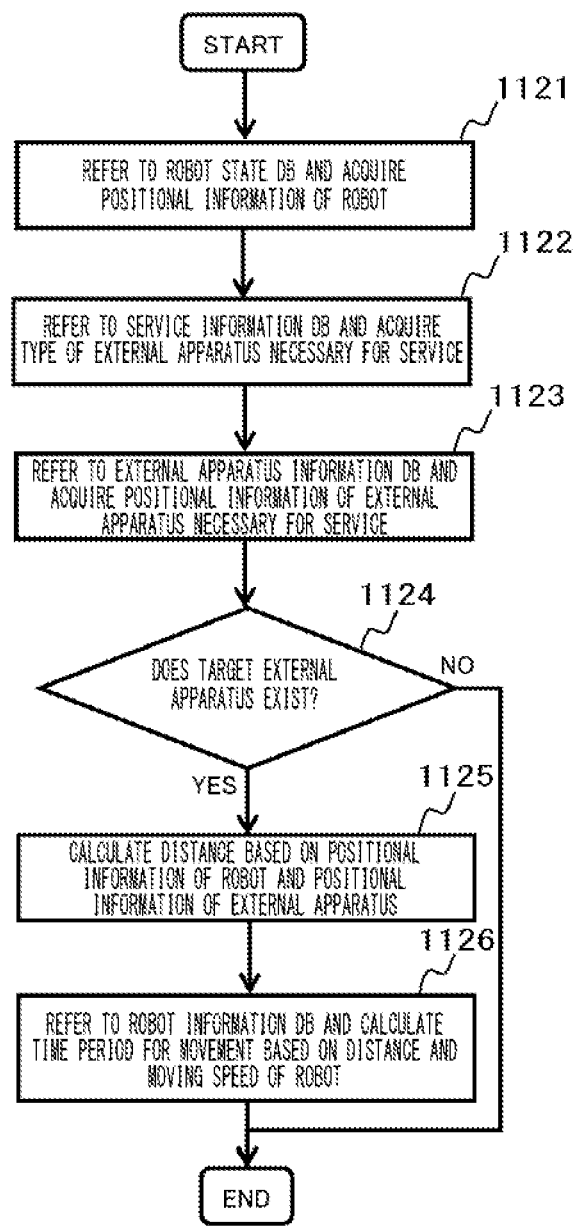
FIG. 4 is a flowchart showing an example of a distance calculation process.

FIG. 4 is a flowchart showing an example of the distance calculation process. The distance calculation process is executed by causing the CPU 102 of the operation management server 10 to execute the distance calculation program 112.

First, the distance calculation program 112 references the robot state DB 121 (FIG. 9) and acquires positional information of the robot 60 (in step 1121). For example, the distance calculation program 112 references the robot state DB 121 using a robot identifier stored in the robot 60 as a key and reads coordinate information (X coordinate and Y coordinate) associated with the robot identifier.

Next, the distance calculation program 112 references the service information DB 122 and acquires the type of an external apparatus necessary to provide the service (in step 1122). For example, the distance calculation program 112 uses, as a key, the service identifier included in the service request acquired in step 1111 to identify the external apparatus 70 necessary to provide the service, like step 1111, and reads the apparatus identifier and the apparatus type that are included in the external apparatus parameter.

Furthermore, the distance calculation program 112 references the external apparatus information DB 123 using the read apparatus identifier and the read apparatus type as a key, acquires positional information of the external apparatus necessary for the service (in step 1123), and determines whether or not the target external apparatus exists (in step 1124). For example, the distance calculation program 112 reads coordinate inform on (X coordinate and Y coordinate) associated with the apparatus identifier and the apparatus type that are stored in the external apparatus information DB 123 and determines whether or not the target external apparatus exists.

If the distance calculation program 112 determines that the target external apparatus does not exist (No in step 1124), the distance calculation program 112 terminates the process. If the distance calculation program 112 determines that the target external apparatus exists (Yes in step 1124), the distance calculation program 112 calculates a distance from the robot 60 to the target external apparatus 70 based on the positional information of the robot 60 and the positional information of the external apparatus 70 (in step 1125). In addition, the distance calculation program 112 references the robot information DB 124 (FIG. 9), acquires the moving speed of the robot, and calculates a time period for the movement of the robot 60 to the position of the external apparatus 70 (in step 1126). For example, the distance calculation program 112 references the robot information DB 124 using the aforementioned robot identifier as a key, reads the moving speed included in a robot parameter associated with the robot identifier, and calculates the moving speed of the robot 60 from the calculated distance and the read moving speed.

Figure 5:
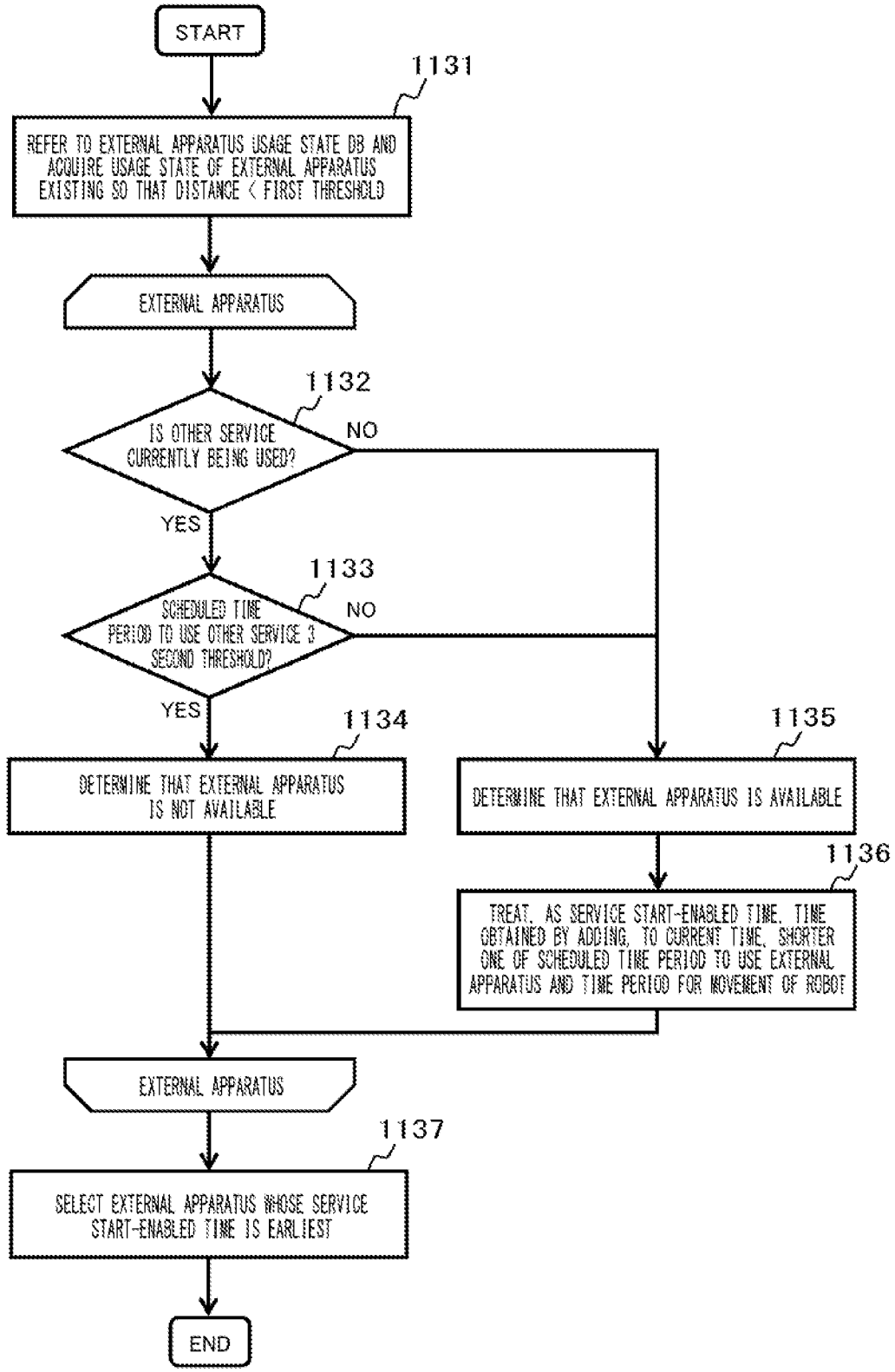
FIG. 5 is a flowchart showing an example of an apparatus availability determination process.

FIG. 5 is a flowchart showing an example of the apparatus availability determination process. The apparatus availability determination process is executed by causing the CPU 102 of the operation management server 10 to execute the apparatus availability determination program 113.

First, the apparatus availability determination program 113 references the external apparatus usage state DB 125 and acquires a usage state (expected service duration) of the external apparatus 70 that exists so that the distance between the robot 60 and the external apparatus 70 is smaller than the first threshold (in step 1131). For example, the apparatus availability determination program 113 references the external apparatus usage state DB 125 using the apparatus identifier read in step 1122 as a key and acquires the expected service duration (for example, expected service duration of a service 1) associated with the apparatus identifier.

Next, the apparatus availability determination program 113 determines whether or not another service is currently being used for each external apparatus 70 existing so that the distance between the robot 60 and the external apparatus 70 is smaller than the first threshold (or whether or not the current time is within the aforementioned expected service duration) (in step 1132). If the apparatus availability determination program 113 determines that the other service is not being used (No in step 1132), the apparatus availability determination program 213 determines that the target external apparatus 70 is available (in step 1135), and the apparatus availability determination program 113 treats, as service start-enabled time, time obtained by adding the time period for the movement of the robot 60 to the external apparatus 70 to the current time.

On the other hand, if the apparatus availability determination program 113 determines that the other service is being used (Yes in step 1132), the apparatus availability determination program 113 compares a scheduled usage time period that is the aforementioned expected service duration of the other service with a second threshold set in advance in accordance with the following first requirement. The second threshold is used to determine an expected end of the scheduled usage time period of the other service.

The first requirement is that the scheduled usage time period≥the second threshold.

The apparatus availability determination program 113 determines whether or not the aforementioned first requirement is satisfied (in step 1133). If the apparatus availability determination program 113 determines that the first requirement is satisfied (Yes in step 1133), the apparatus availability determination program 113 determines that the external apparatus 70 is not available (in step 1134). If the apparatus availability determination program 113 determines that the first requirement is not satisfied (No in step 1133), the apparatus availability determination program 113 determines that the external apparatus 70 is available (in step 1135), and the apparatus availability determination program 113 treats, as the service start-enabled time, time obtained by adding, to the current time, a shorter one of the scheduled usage time period of the other service currently using the external apparatus 70 and the time period for the movement of the robot 60 to the external apparatus 70 or treats the time when the service can be started early as the service start-enabled time (in step 1136).

Then, the apparatus availability determination program 113 selects an external apparatus 70 whose service start-enabled time is the earliest from among all the external apparatuses 70 (in step 1137), and the apparatus availability determination program 113 terminates the process.

Figure 6:
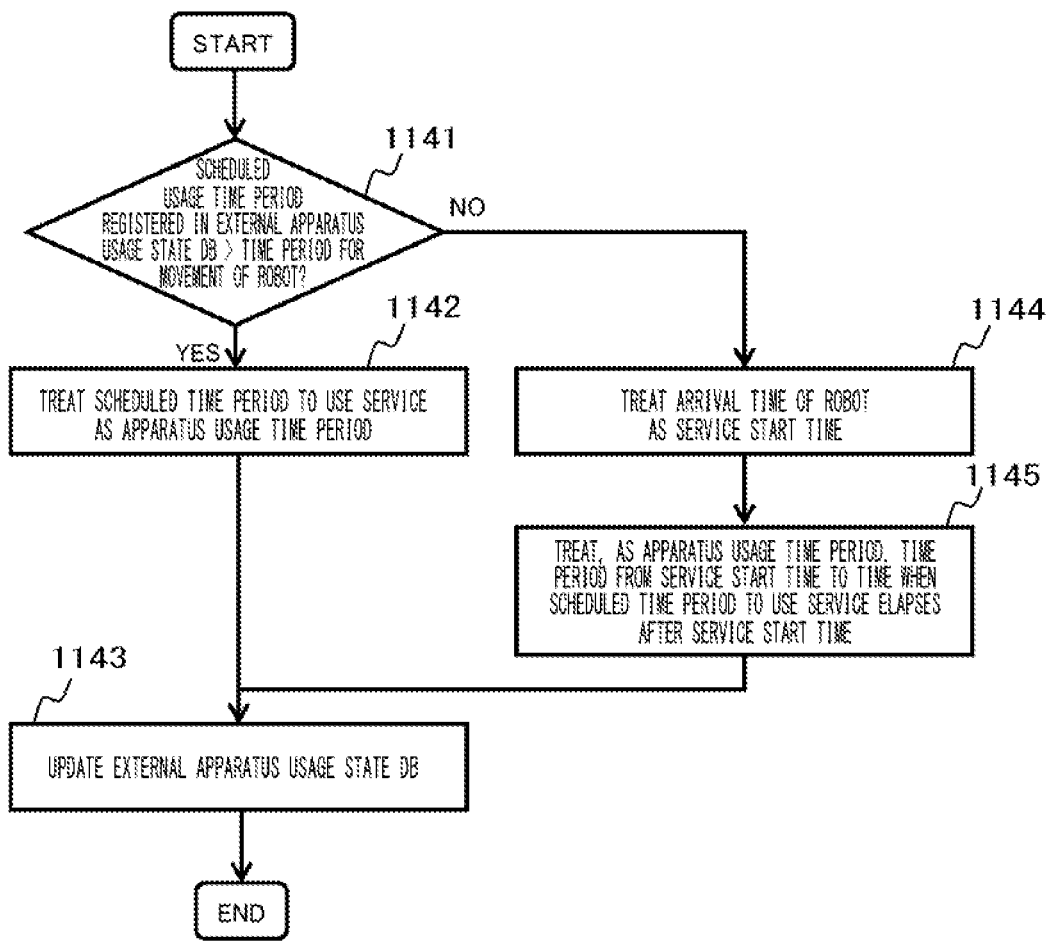
FIG. 6 is a flowchart showing an example of an apparatus usage time period calculation process.

FIG. 6 is a flowchart showing an example of the apparatus usage time period calculation process. The apparatus usage time period calculation process is executed by causing the CPU 102 of the operation management server 10 to execute the apparatus usage time period calculation program 114.

First, the apparatus usage time period calculation program 114 compares the scheduled usage time period (or the aforementioned expected service duration) of the service currently using the external apparatus 70 with the time period for the movement of the robot 60 to the external apparatus 70 and determines whether or not the scheduled usage time period is longer than the time period for the movement of the robot 60 (in step 1141).

If the apparatus usage time period calculation program 114 determines that the scheduled usage time period is longer than the time period for the movement of the robot 60 (Yes in step 1141), the apparatus usage time period calculation program 114 calculates a scheduled usage time period from the end time (end time of the aforementioned expected service duration) of the service currently using the external apparatus 70 to the end time (standard duration of remaining states among standard duration) of the remaining service of the service information DB 122, treats the calculated scheduled service usage time period as an apparatus usage time period (in step 1142), updates expected service duration indicated in the external apparatus usage state DB 125 for the states (in step 1143), and terminates the process.

Specifically, since the scheduled usage time period is longer than the time period for the movement of the robot 60, the apparatus usage time period calculation program 114 determines that the service is still continuously being used after the movement of the robot 60. The apparatus usage time period calculation program 114 references the service information DB 122 using the service identifier included in the service request acquired in step 1111 as a key and reads the standard duration associated with the service identifier and the standard duration (standard duration of the states 1 to N) of the states. The apparatus usage time period calculation program 114 references the external apparatus usage state DB 125 using the apparatus identifier read in step 1122 as a key, calculates the end time of the remaining service from the current time and the end time of the service, calculates a time period to the time when the current time reaches the calculated time as a new scheduled service usage time period, and updates expected service duration of the external apparatus usage state DB 125 to the new scheduled service usage time period.

On the other hand, if the apparatus usage time period calculation program 114 determines that the scheduled usage time period is not longer than the time period for the movement of the robot 60 (No in step 1141), or if the time period for the movement of the robot 60 to the external apparatus 70 is longer, the apparatus usage time period calculation program 114 treats the time when the robot 60 arrives at the external apparatus 70 as service start time (in step 1144), and the apparatus usage time period calculation program 114 treats, as a new scheduled service usage time period, a time period from the service start time to the time when the scheduled service usage time period calculated in step 1142 elapses after the service start time (in step 1145), updates the expected service duration indicated in the external apparatus usage state DB 125 to the new scheduled service usage time period (in step 1143), and terminates the process.

Figure 7:
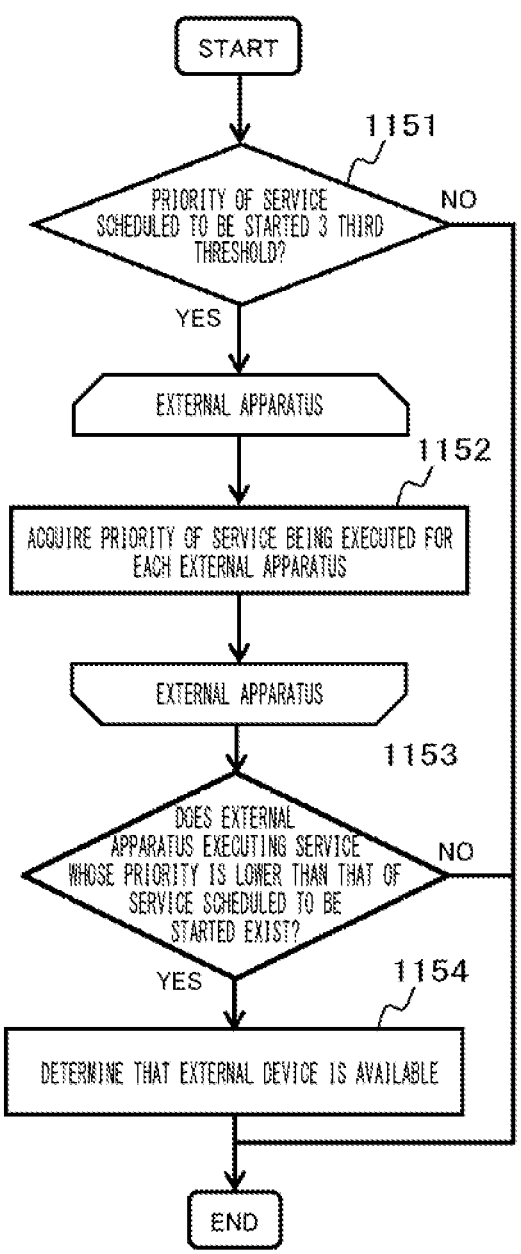
FIG. 7 is a flowchart showing an example of a service priority determination process.

FIG. 7 is a flowchart showing an example of the service priority determination process. The service priority determination process is executed by causing the CPU 102 of the operation management server 10 to execute the service priority determination program 115.

First, the service priority determination program 115 compares a priority of the service scheduled to be started and to be provided with a third threshold in accordance with the following second requirement (in step 1151). For example, the service priority determination program 115 references the service information DB 122 using the service identifier of the service to be provided as a key, reads the priority associated with the service identifier, and determines whether or not the following second requirement is satisfied. The third threshold is used to determine whether or not the service to be provided is prioritized over another service.

The second requirement is that the priority of the service scheduled to be started≥the third threshold.

The service priority determination program 115 determines whether or not the second requirement is satisfied (in step 1151). If the service priority determination program 115 determines that the second requirement is not satisfied (No in step 1151), the service priority determination program 115 terminates the process. On the other hand, if the service priority determination program 115 determines that the second requirement is satisfied (Yes in step 1151), the service priority determination program 115 acquires a priority of a service being executed for each external apparatus determined to be available in step 1115 (in step 1152). For example, the service priority determination program 115 references the external apparatus usage state DB 125 using an apparatus identifier of each external apparatus 70 determined to be available as a key and reads the service priority associated with the apparatus identifier.

The service priority determination program 115 compares the priority of the service scheduled to be started with the priorities of the services being executed by the external apparatuses 70 and determines whether or not an external apparatus 70 executing a service whose priority is lower than the priority of the service scheduled to be started exists (in step 1153). If the service priority determination program 115 determines that the external apparatus 70 executing the service whose priority is lower than the priority of the service scheduled to be started does not exist (No in step 1153), the service priority determination program 115 terminates the process. On the other hand, if the service priority determination program 115 determines that the external apparatus 70 executing the service whose priority is lower than the priority of the service scheduled to be started exists (Yes in step 1153), and even if the external apparatus coordination program 111 temporarily determines that the external apparatus 70 is not available in step 1115, the service priority determination program 115 determines that the external apparatus 70 is available (in step 1154). Then, the service priority determination program 115 terminates the process.

Figure 8:
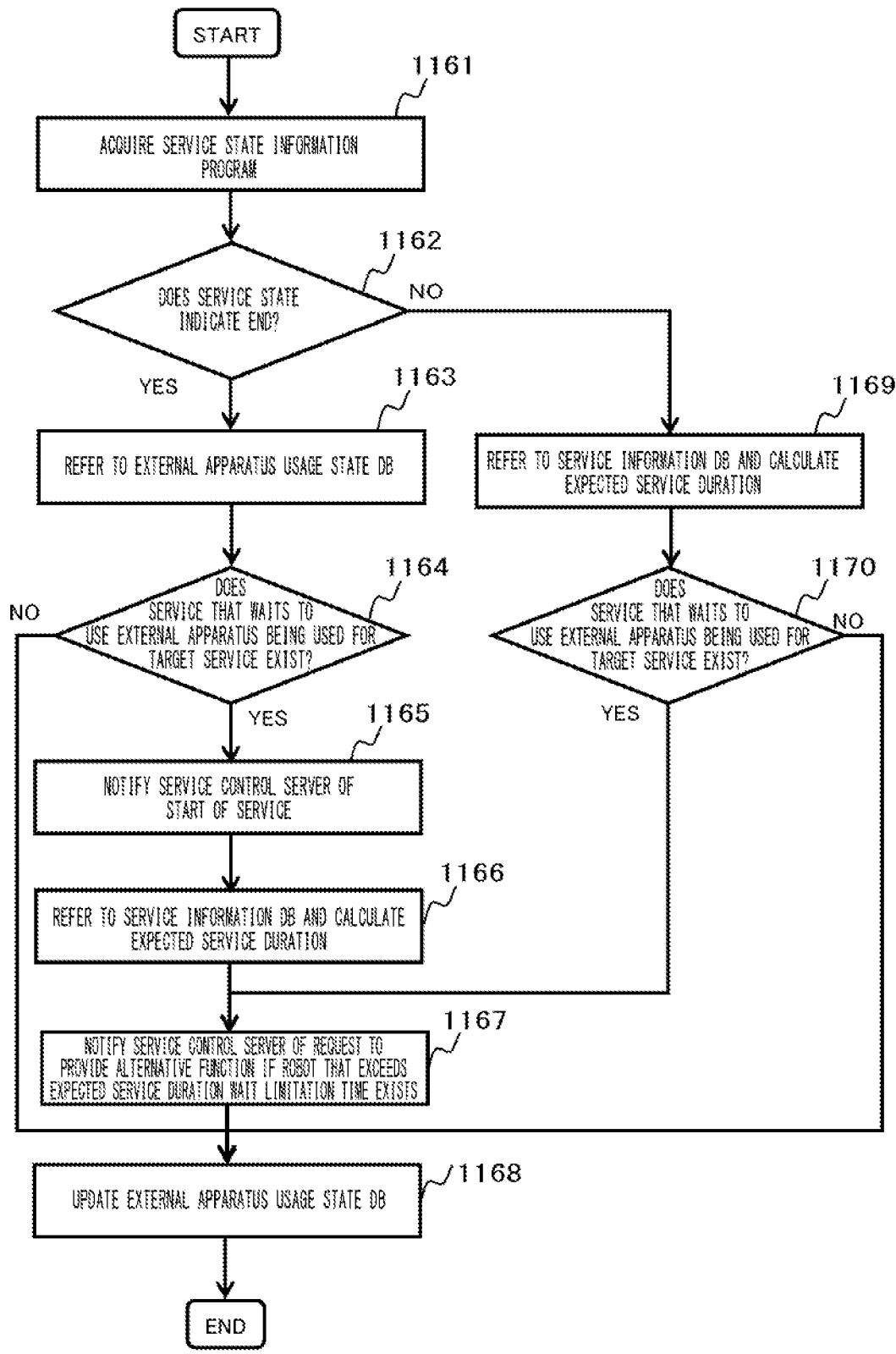
FIG. 8 is a flowchart showing an example of an apparatus usage time period update process.

FIG. 8 is a flowchart showing an example of the apparatus usage time period update process. The apparatus usage time period update process is executed by causing the CPU 102 of the operation management server 10 to execute the apparatus usage time period update program 116.

First, the apparatus usage time period update program 116 acquires service state information (FIG. 14) indicating the current state and progress of the service from the service control server 20 (in step 1161). For example, the apparatus usage time period update program 116 references a service information DB 221 stored in the service control server 20 using the service identifier of the service to be provided as a key and acquires a state operation and a service parameter that are associated with the service identifier. In addition, the apparatus usage time period update program 116 references a service state information DB 222 and acquires state information including a service state, start time, and scheduled end time that are associated with a currently provided service identifier matching the aforementioned service identifier.

Next, the apparatus usage time period update program 116 determines whether or not the service state acquired from the service state information DB 222 is a state indicating the end (in step 1162). If the apparatus usage time period update program 116 determines that the service state is not the state indicating the end (No in step 1162), the apparatus usage time period update program 116 references the service state information DB 122 and calculates expected duration from the current service state to the end of the service (in step 1169).

For example, the apparatus usage time period update program 116 references the service information DB 122 using the service identifier of the aforementioned service to be provided as a key and calculates the aforementioned expected duration by summing state standard duration associated with a state of the state operation acquired in step 1161 and standard duration of a remaining state succeeding the target state.

In addition, the apparatus usage time period update program 116 determines whether or not a service that waits to use an external apparatus 70 being used for a service identified by the currently provided service identifier associated with the service state acquired in step 1161 exists (in step 1170). If the apparatus usage time period update program 116 determines that the service does not exist (No in step 1170), the apparatus usage time period update program 116 terminates the process. For example, the apparatus usage time period update program 116 references the external apparatus usage state DB 125 using the apparatus identifier read in step 1115 as a key and uses the external apparatus 70 identified by the apparatus identifier to determine whether or not a service whose priority is lower than that of the service identified by the currently provided service identifier exists. If the apparatus usage time period update program 116 determines that the service does not exist, the apparatus usage time period update program 116 terminates the process.

On the other hand, if the apparatus usage time period update program 116 determines that the service exists (Yes in step 1170), or if the apparatus usage time period update program 116 determines that the service that waits to use the external apparatus 70 being used for the service whose service state has been acquired exists, the process proceeds to step 1167.

The description returns to step 1162. If the apparatus usage time period update program 116 determines that the service state acquired from the service control server 20 is the state indicating the end (Yes in step 1162), the apparatus usage time period update program 116 references the external apparatus usage state SB 125 (in step 1163) and determines whether or not another service that waits to use the external apparatus being used for the service exists (in step 1164), like step 1170. If the apparatus usage time period update program 116 determines that the other service that waits to use the external apparatus being used for the service does not exist (No in step 1164), the apparatus usage time period update program 116 updates the external apparatus usage state DB 125 (in step 1168) and terminates the process.

On the other hand, if the apparatus usage time period update program 116 determines that the other service that waits to use the external apparatus being used for the service exists (Yes in step 1164), the apparatus usage time period update program 116 transmits, to the service control server 20, a message notifying the start of the service waiting to be executed next (in step 1165). For example, the apparatus usage time period update program 116 references the external apparatus usage state DB 125 using the apparatus identifier read in step 1115 as a key and uses the external apparatus 70 identified by the apparatus identifier to determine whether or not a service whose priority is lower than that of the service identified by the currently provided service identifier exists. If the apparatus usage time period update program 116 determines that the service exists, the apparatus usage time period update program 116 transmits, the service control service 20, the message including the service identifier of the service whose priority is lower.

In addition, the apparatus usage time period update program 116 references the service information DB 122 and calculates expected service duration for each service that waits to use an external apparatus (in step 1166). The expected service duration is the total of standard duration of states from the current state to a state N.

The apparatus usage time period update program 116 determines whether or not the calculated expected service duration of the services waiting to use external apparatuses exceeds wait limitation time defined for the services. If the expected service duration of each service does not exceed the wait limitation time of the service, the apparatus usage time period update program 116 causes a robot 60 providing the service to stand by. If the expected service duration exceeds the wait limitation time, the apparatus usage time period update program 116 transmits, to the service control service 20, a message requesting the service control service 20 to provide an alternative function of the service (in step 1167), updates the external apparatus usage state DB 125 (in step 1168), and terminates the process.

FIG. 9 shows the structures of the various databases stored in the memory 101 of the operation management server 10.

The robot state DB 121 is a database to be used to manage information on the states of the robots 60. As shown in FIG. 9, the robot state DB 121 includes robot identifies identifying the robots 60, a site identifier identifying the service site 90 in which the robots 60 are installed, a site map including geographical information of the site identified by the site identifier, and X and Y coordinates indicating positional information of the robots 60 in the site map. The site identifier uniquely identifies the site, and a character string or the like that is set in accordance with the name of the site or system naming convention is specified. The site map is information on the physical structure of the site, such as the shape, size, sketch, and the like of the service site 90, and the information is initially set upon the installation of the robots 60. Each robot 60 has a self-localization function and can determine the position (X coordinate and Y coordinate) of the robot 60 within the service site 90 by using a laser range finder or the like to measure the distance between the robot 60 and a wall located around the robot 60.

The service information DB 122 is a database to be used to manage information of services to be provided by the robots 60. As shown in FIG. 9, the service information DB 122 includes service identifiers uniquely identifying the services, state standard time periods that are standard time periods required to execute the services, standard state duration that is standard time periods required to execute operations and control in states indicating states of the services, service priorities indicating priorities of the services, external apparatus parameters indicating requirements for the external apparatuses to execute the services, and alternative function identifiers uniquely identifying alternative functions to be executed when the services are not able to be executed. The external apparatus parameters include apparatus identifiers of the external apparatuses 70 and apparatus types of the external apparatuses 70. The apparatuses that are required to provide the services, and information identifying the apparatuses are stored as the requirements for the external apparatuses 70 such as apparatus types that are a monitor (01), a speaker (02), a touch panel (03), and the like, for example. In the service information DB 122, alternative applications for providing the alternative functions are associated with the alternative function identifiers and stored. For example, if a service that is not able to be provided is a guidance service using a display, an application for outputting audio information using a speaker and conducting guidance is stored as an alternative function of the service. A state operation and a service parameter that are similar to those of a service identifier are associated with an alternative function identifier of an alternative application for each state indicating the state of a service provided by the alternative application and are stored as an alternative state operation and an alternative service parameter.

The external apparatus information DB 123 is a database to be used to manage information of external apparatuses 70 available for the robots 60. As shown in FIG. 9, the external apparatus information DB 123 includes the apparatus identifiers uniquely identifying the external apparatuses 70, the apparatus types indicating the types of the external apparatuses 70, X and Y coordinates that are positional information of the external apparatuses 70 installed in the service site 90, and a list of parameters (apparatus control parameters 1 to N) able to be used to control the external apparatuses 70. Details of the apparatus control parameters vary depending on the types of the target external apparatuses 70. If the external apparatuses 70 are output devices such as digital signages, turning on and off of screens, identifiers of contents to be displayed on the screens, or display locations (pages, URLs, or the like) on contents are set as the apparatus control parameters. If the external apparatuses are cameras, angles (pan angles or tilt angles) of the cameras can be set as the apparatus control parameters. If the service devices are elevators, the apparatus control parameters may be requests for movements to the elevators, floor numbers, or the like.

The robot information DB 124 is a database to be used to manage information of the robots 60 managed by the operation management server 10. As shown in FIG. 9, the robot information DB 124 includes robot identifiers uniquely identifying the robots and a list of parameters (robot parameters 1 to N) indicating the performance of the robots. For example, parameters related to moving speeds of the robots 60, rotational speeds of the robots 60, and the resolutions of touch panels are stored as the robot parameters.

The external apparatus usage state DB 125 is a database to be used to manage usage schedules of the external apparatuses 70. As shown in FIG. 9, the external apparatus usage state DB 125 includes expected duration (expected duration of services 1 to N) of services for which external apparatuses are scheduled to be used, and priorities (priorities of the services 1 to N) of the services for which the external apparatuses are scheduled to be used. Expected service duration indicates a time period to the end of a service being provided. In addition, the service priorities indicate the order in which the services associated with the expected service duration are prioritized. For example, as a priority is higher, a larger value is stored for the priority.

Figure 10:
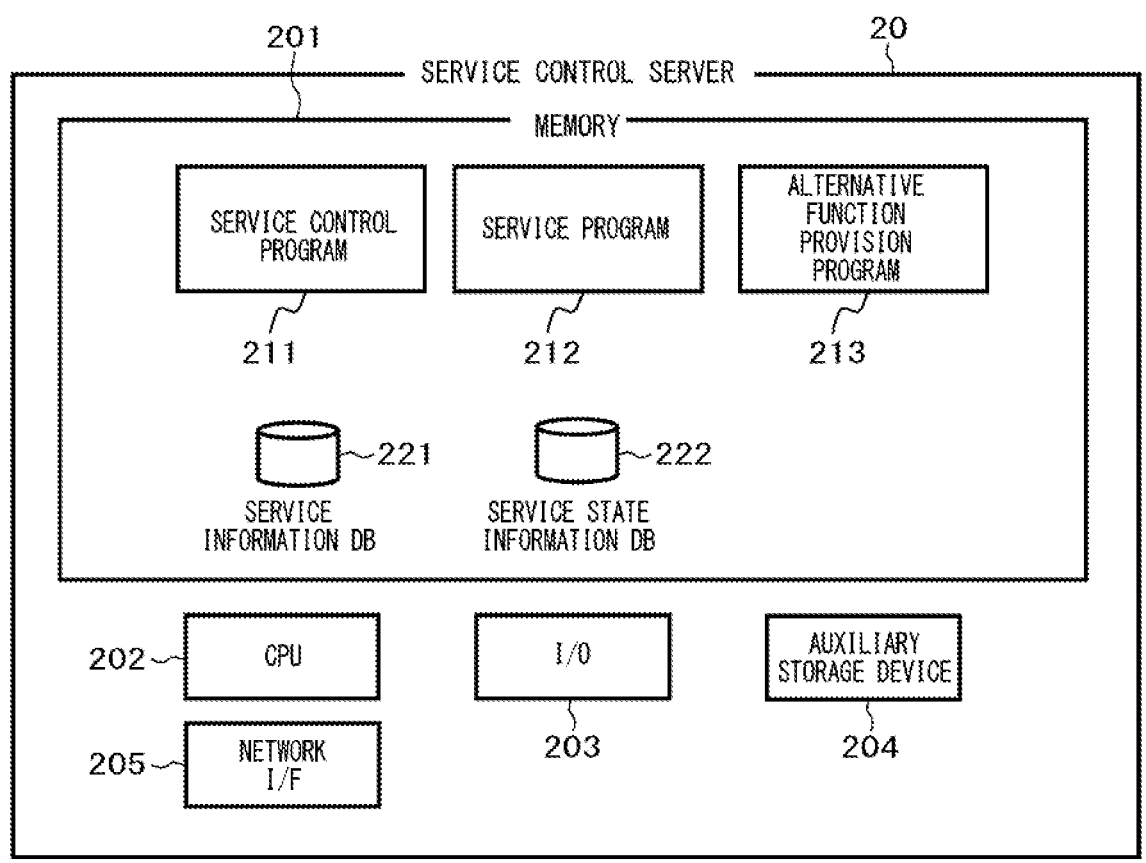
FIG. 10 is a diagram showing an example of the configuration of a service control server.

FIG. 10 is a diagram showing an example of the configuration of the service control server 20. In the service control server programs (software) are stored in an auxiliary storage device 204 for a general computer, and a CPU 202 loads the programs read from the auxiliary storage device 204 into a memory 201 and executes the programs. The service control server 20 communicates with another server, service devices, and the robots via a network I/F 205.

An I/O 203 is a user interface that is used by a user to input an instruction to the service control server 20 and presents the results of executing the programs and the like to the user. The I/O 203 is connected to input and output devices (for example, a keyboard, a mouse, a touch panel, a display, a printer, and the like). The I/O 203 may be connected to a user interface to be provided by a management terminal connected via the network.

The CPU 202 is a processor that executes the programs stored in the memory 201. The memory 201 includes a ROM that is a nonvolatile storage element and a RAM that is a volatile storage element. The ROM stores an unchanged program (for example, a basic input output system (BIOS)) and the like. The RAM is a high-speed volatile storage element such as a DRAM and temporarily stores the programs stored in the auxiliary storage device 204 and data to be used upon the execution of the programs.

Specifically, the memory 201 stores a service control program 211, a service program 212, and an alternative function provision program 213.

Figure 11:
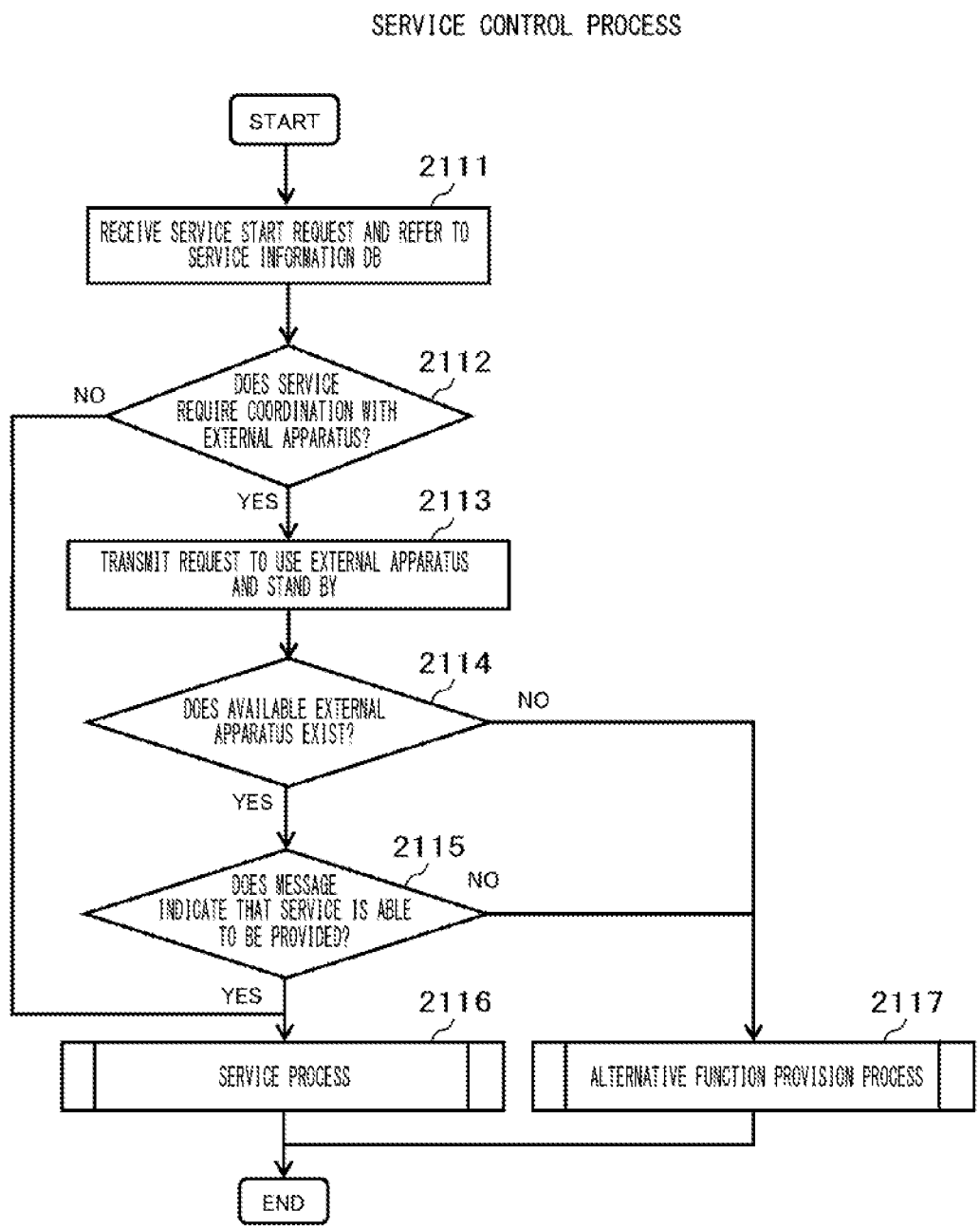
FIG. 11 is a flowchart showing an example of a service control process.

The service control program 211 is a program for executing a service control program (refer to FIG. 11). The service program 212 is a program for executing a service process (refer to FIG. 12). The alternative function provision program 213 is a program for executing an alternative function provision process (refer to FIG. 13).

In addition, the memory 201 stores the service information DB 221 (refer to FIG. 14) and the service state information DB 222 (refer to FIG. 14).

The auxiliary storage device 204 is a large-capacity nonvolatile storage device such as a magnetic storage device (HDD) or a flash memory (SSD), for example. The auxiliary storage device 204 stores the programs to be executed by the CPU 202 and the data to be used upon the execution of the programs. Specifically, the programs are read from the auxiliary storage device 204, loaded into the memory 201, and executed by the CPU 202.

The service control server 20 is a computer system composed of a single physical computer or composed of multiple logical or physical computers. The programs stored in the memory 201 may be executed with separate threads in the same computer or may be executed in a virtual computer built in multiple physical computer resources. The service control server 20 and another device may be installed in a single physical or logical computer. All or a part of the processes achieved by the execution of the programs may be achieved by hardware (for example, an FPGA).

The aforementioned programs may be installed in the ROM or the like and provided or may be recorded as an installable or executable file in a computer readable recording medium such as a CD-ROM, a CD-R, or a DVD and provided and distributed. The aforementioned programs may be stored in a computer connected to a network such as the Internet and may be downloaded via the network and provided and distributed.

FIG. 11 is a flowchart showing an example of the service control process. The service control process is executed by causing the CPU 202 of the service control server 20 to execute the service control program 211.

First, upon receiving a service start request including a service identifier and a robot identifier or including the service identifier or an apparatus identifier from a robot 60 or an external apparatus 70, the service control program 211 references the service information DB 221 using the service identifier as a key (in step 2111) and determines whether or not a service identified by the service identifier requires coordination with an external apparatus (in step 2112). For example, the service control program 211 reads a state operation and a service parameter that are associated with the service identifier and determines whether or not an apparatus identifier of the external apparatus 70 is included as the service parameter associated with the state operation.

If the service control program 211 determines that the service does not require the coordination with the external apparatus 70 (No in step 2112), the service control program 211 executes the service process (refer to FIG. 12) and terminates the process. On the other hand, if the service control program 211 determines that the service requires the coordination with the external apparatus 70 (Yes in step 2112), the service control program 211 transmits a request message indicating a request to use the external apparatus 70 to the operation management server 10 and stands by (in step 2113). The request message includes the aforementioned apparatus identifier.

The service control program 211 receives a message including a result indicating whether or not an external apparatus 70 available for the operation management server 10 exists and including a scheduled time period to the time when the external apparatus 70 becomes available, and the service control program 211 determines whether an available external apparatus 70 exists (in step 2114). For example, the service control program 211 determines whether an available external apparatus exists by receiving, as the aforementioned result from the operation management server 10, an availability message in which information including an apparatus identifier and apparatus type of an available external apparatus and stored in the external apparatus information DB 123 is associated with expected service duration associated with the apparatus identifier at that time and stored in the latest external apparatus usage state DB 125 or receiving, as the aforementioned result from the operation management server 10, an unavailability message indicating that the service to be provided is not able to be continuously used.

If the service control program 211 receives the availability message from the operation management service 10 and determines that the available external apparatus 70 exists (Yes in step 2114), the service control program 211 determines whether or not the message indicates that the service is able to be provided (in step 2115). For example, the service control program 211 determines whether or not the expected service duration included in the availability message received from the operation management server 10 is longer than a threshold (for example, the second threshold) indicating a time period permitted to wait until a service defined in advance is provided. If the service control program 211 determines that the expected service duration is shorter than the threshold, the service control program 211 determines that the service is able to be provided. If the service control program 211 determines that the expected service duration is equal to or longer than the threshold, the service control program 211 determines that the service is not able to be provided.

If the service control program 211 determines that the service is able to be provided (Yes in step 2115), the service control program 211 causes the service program 212 to execute the service process (refer to FIG. 12) of providing the service (in step 2116) and terminates the process. On the other hand, if the service control program 211 receives the unavailability message from the operation management server 10 and determines that the available external apparatus 70 does not exist (No in step 2114) or the service control program 211 determines that the service is not able to be provided (No in step 2115), the service control program 211 causes the alternative function provision program 213 to execute the alternative function provision process (refer to FIG. 13) of providing an alternative function of the service (in step 2117) and terminates the process.

Figure 12:
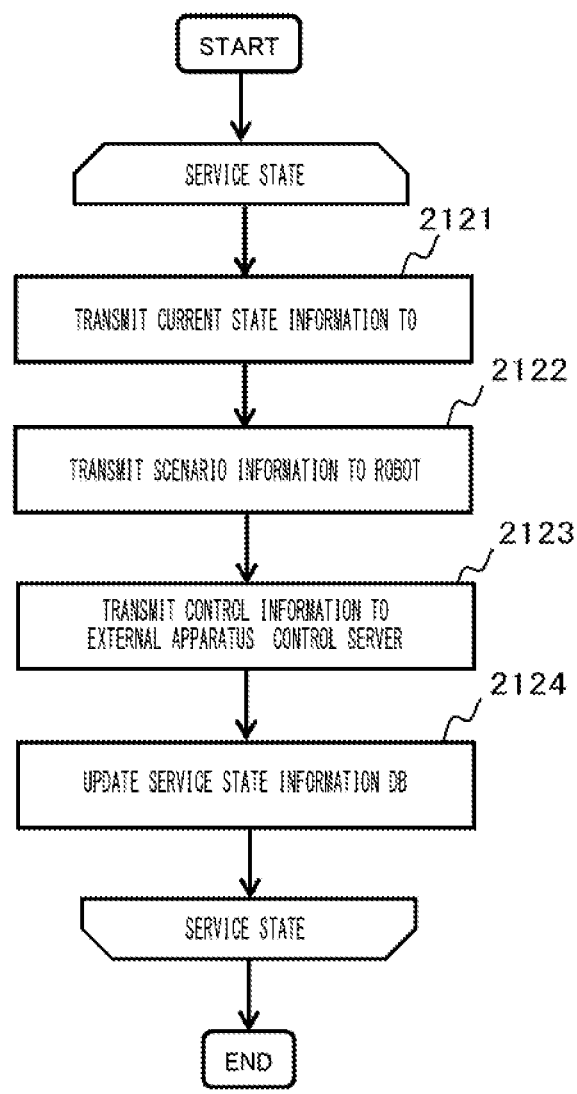
FIG. 12 is a flowchart showing an example of a service process.

FIG. 12 is a flowchart showing an example of the service process. The service process is executed by causing the CPU 202 of the service control server 20 to execute the service program 212.

First, the service program 212 transmits current state information to the operation management server 10 (in step 2121). For example, the service program 212 references the service state information DB 222 using, as a key, the service identifier included in the service start request received from the robot 60 or the external apparatus 70 in step 2111, reads a service state, start time, and scheduled end time that are associated with a currently provided service identifier matching the service identifier, and transmits the read information as the state information to the operation management server 10.

Subsequently, the service program 212 transmits scenario information corresponding to the service state to the robot 60 identified by the robot identifier included in the service start request (in step 2122). For example, the service program 212 reads and transmits the scenario information included in the service state associated with the currently provided service identifier. The scenario information includes a scenario identifier identifying a scenario constituting the service being provided and an operation order number indicating the order of scenario operations constituting the scenario identified by the scenario identifier. The scenario identifier and the operation order number are described later.

The service program 212 references the service information DB 221 using, as a key, the service identifier included in the service start request received from the robot 60 or the external apparatus 70, reads the state operation associated with the service identifier, and transmits a service parameter associated with the read state operation as control information of the external apparatus 70 to an external apparatus control server 30 (in step 2123). For example, if the aforementioned state operation is an operation of conducting guidance using a display, the service program 212 transmits a service parameter (for example, an apparatus control parameter for an external apparatus for turning on the display) associated with the operation as the control information to the external apparatus control server 30.

The service program 212 updates the service state information DB 222 (in step 2124) and terminates the process. For example, the service program 212 executes the service to be provided. Then, every time the state operations 1 to N are executed, the service program 212 writes the state operations started to be executed to service states of the service state information DB 222. In this case, the service program 212 writes the state operation started to be executed and the start time and scheduled end time of the state operation started to be executed and treats the written information as current state information. The state operations are service states transmitted in step 2121. After the service program 212 executes a certain state operation (for example, turning-on), the service program 212 updates the state operation to the next state operation (for example, the display of a greeting message on the display).

Figure 13:
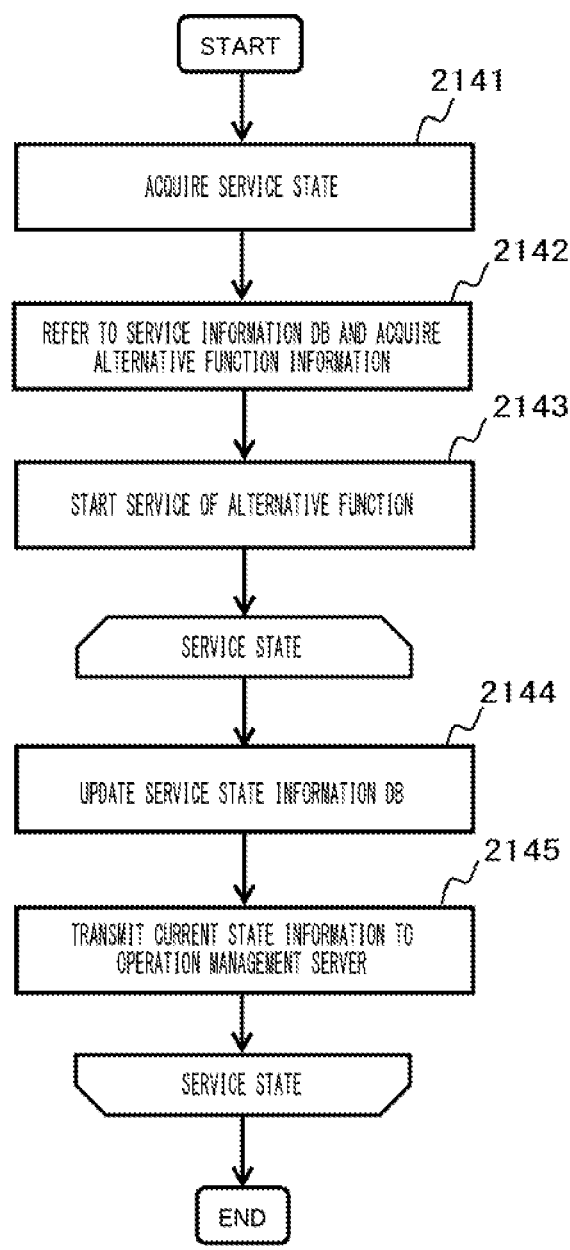
FIG. 13 is a flowchart showing an example of an alternative function provision process.

FIG. 13 is a flowchart showing an example of the alternative function provision process. The alternative function provision process is executed by causing the CPU 202 of the service control server 20 to execute the alternative function provision program 213.

First, when the alternative function provision program 213 acquires a service state associated with the currently provided service identifier (in step 2141), the alternative function provision program 213 references the service information DB 221 and acquires an alternative function identifier associated with a service identifier matching the currently provided service identifier (in step 2142). The alternative function provision program 213 activates an alternative application associated with the alternative function identifier and stored, starts a service of the alternative function (in step 2143), updates the service state information DB 222 for each alternative state operation (in step 2144), transmits the current state information to the operation management server 10 (in step 2145), and terminates the process. For example, the alternative function provision program 213 executes the activated alternative application. Every time the alternative state operations 1 to N are executed, the alternative function provision program 213 writes the alternative state operations started to be executed to service states of the service state information DB 222. In this case, the alternative function provision program 213 writes the alternative state operation started to be executed and start time and scheduled end time of the alternative state operation started to be executed and transmits the service state information DB 222 after the writing and the current state information to the operation management server 10.

FIG. 14 shows the structures of the various databases included in the memory 201 of the service control server 20.

The service information DB 221 is a database to be used to manage information of the services to be provided by the robots 60. As shown in FIG. 14, the service information DB 221 includes the service identifiers uniquely identifying the services, state operations indicating operations of states constituting the services identified by the service identifiers, service parameters indicating parameters necessary to execute the services by the state operations, the alternative function identifies uniquely identifying the alternative functions to be executed when the services are not able to be executed, alternative state operations indicating operations of states constituting the alternative applications identified by the alternative function identifiers, and alternative service parameters indicating parameters necessary to execute the alternative applications by the alternative state operations. The state operations and the alternative state operations include information necessary for the robots 60 to operate scenarios and include control information to be used to control the external apparatuses 70.

The service state information DB 222 is a database to be used to manage services being provided by the service control server 20. As shown in FIG. 14, the service state information DB 222 includes a currently provided service identifier uniquely identifying a service being provided, service states of the service being provided, start time and scheduled end time of state operations or alternative state operations stored as service states.

Figure 15:
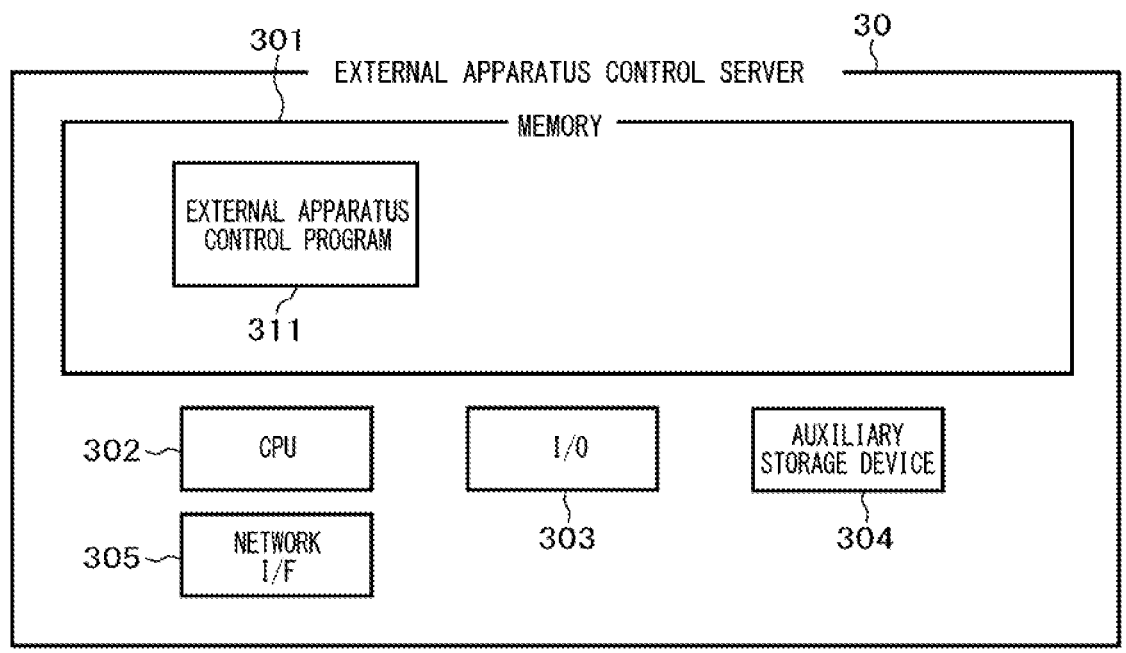
FIG. 15 is a diagram showing an example of the configuration of an external apparatus control server.

FIG. 15 is a diagram showing an example of the configuration of the external apparatus control server 30. In the external apparatus control server 30, a program (software) is stored in an auxiliary storage device 304 for a general computer, and a CPU 302 loads the program read from the auxiliary storage device 304 into a memory 301 and executes the program. The external apparatus control server 30 communicates with another server, service devices, and the robots via a network interface (I/F) 105.

An I/O 303 is a user interface that is used by a user to input an instruction to the external apparatus control server 30 and presents the result of executing the program and the like to the user. The I/O 303 is connected to input and output devices (for example, a keyboard, a mouse, a touch panel, a display, a printer, and the like). The I/O 303 may be connected to a user interface to be provided by a management terminal connected via the network.

The CPU 302 is a processor that executes the program stored in the memory 301. The memory 301 includes a ROM that is a nonvolatile storage element and a RAM that is a volatile storage element. The ROM stores an unchanged program (for example, a basic input output system (BIOS)) and the like. The RAM is a high-speed volatile storage element such as a DRAM and temporarily stores the program stored in the auxiliary storage device 304 and data to be used upon the execution of the program.

Specifically, the memory 301 stores an external apparatus control program 311.

Figure 16:
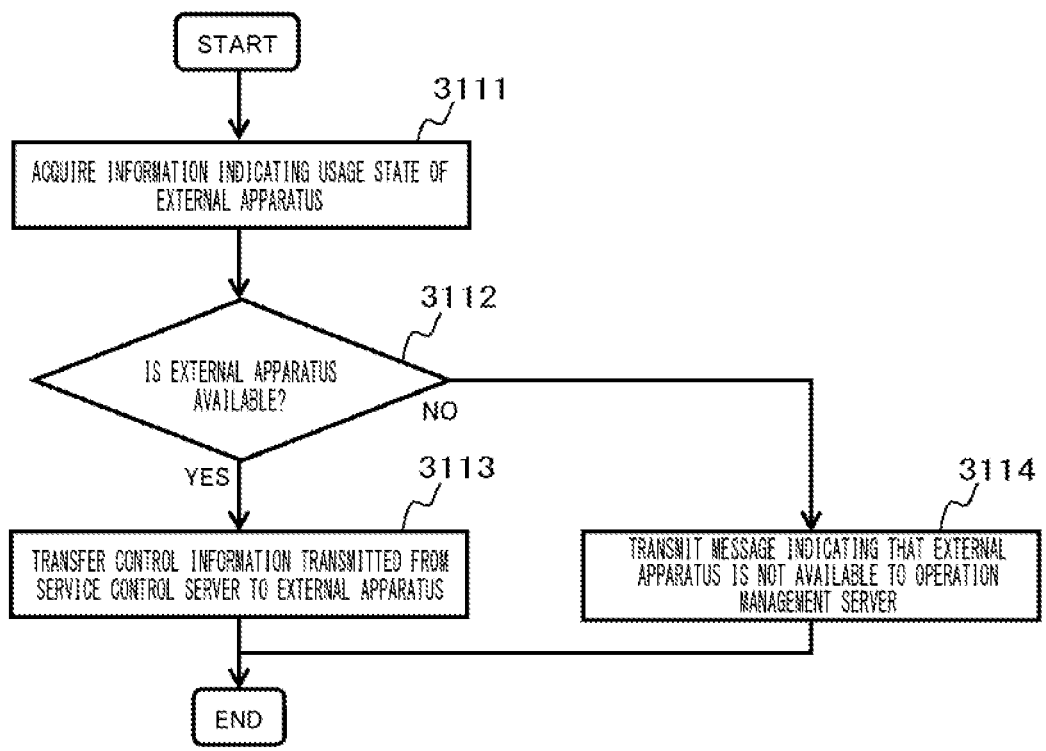
FIG. 16 is a flowchart showing an example of an external apparatus control process.

The external apparatus control program 311 is a program for executing an external apparatus coordination process (refer to FIG. 16).

The auxiliary storage device 304 is a large-capacity nonvolatile storage device such as a magnetic storage device (HDD) or a flash memory (SSD). In the auxiliary storage device 304, the program to be executed by the CPU 302 and data to be used upon the execution of the program are stored. Specifically, the program is read from the auxiliary storage device 304, loaded into the memory 301, and executed by the CPU 302.

The external apparatus control server 30 is a computer system composed of a single physical computer or composed of multiple logical or physical computers. The program stored in the memory 301 may be executed with separate threads in the same computer or may be executed in a virtual computer built in multiple physical computer resources. The external apparatus control server 30 and another device may be installed in a single physical or logical computer. The entire process achieved by the execution of the program or a part of the process may be achieved by hardware (for example, an FPGA).

The aforementioned program may be installed in the ROM or the like and provided or may be recorded as an installable or executable file in a computer-readable recording medium such as a CD-ROM, a CD-R, or a DVD and provided and distributed. The aforementioned program may be stored in a computer connected to a network such as the Internet and may be downloaded via the network and provided and distributed.

FIG. 16 is a flowchart showing an example of the external apparatus control process. The external apparatus control process is executed by causing the CPU 302 of the external apparatus control server 30 to execute the external apparatus control program 311.

First, upon acquiring information (for example, the external apparatus use request acquired in step 2113) indicating that an external apparatus 70 is to be used, the external apparatus control program 311 acquires information indicating a usage state of the external apparatus 70 (in step 3111). The information indicating the usage state indicates whether or not the external apparatus 70 is available. For example, the information indicating the usage state is a signal indicating that the external apparatus 70 is in a busy state.

The external apparatus control program 311 determines whether or not the acquired information indicating the usage state indicates that the external apparatus 70 is available (in step 3112). If the external apparatus control program 311 determines that the acquired information indicates that the external apparatus 70 is available (Yes in step 3112), the external apparatus control program 311 transfers the control information transmitted from the service control server 20 in step 2123 and indicating the external apparatus 70 to the external apparatus 70 (in step 3113).

On the other hand, if the external apparatus control program 311 determines that the acquired information indicates that the external apparatus is not available (No in step 3112), the external apparatus control program 311 transmits a message indicating that the external apparatus 70 is not available to the operation management server 10 (in step 3114), and the external apparatus control program 311 terminates the process.

Figure 17:
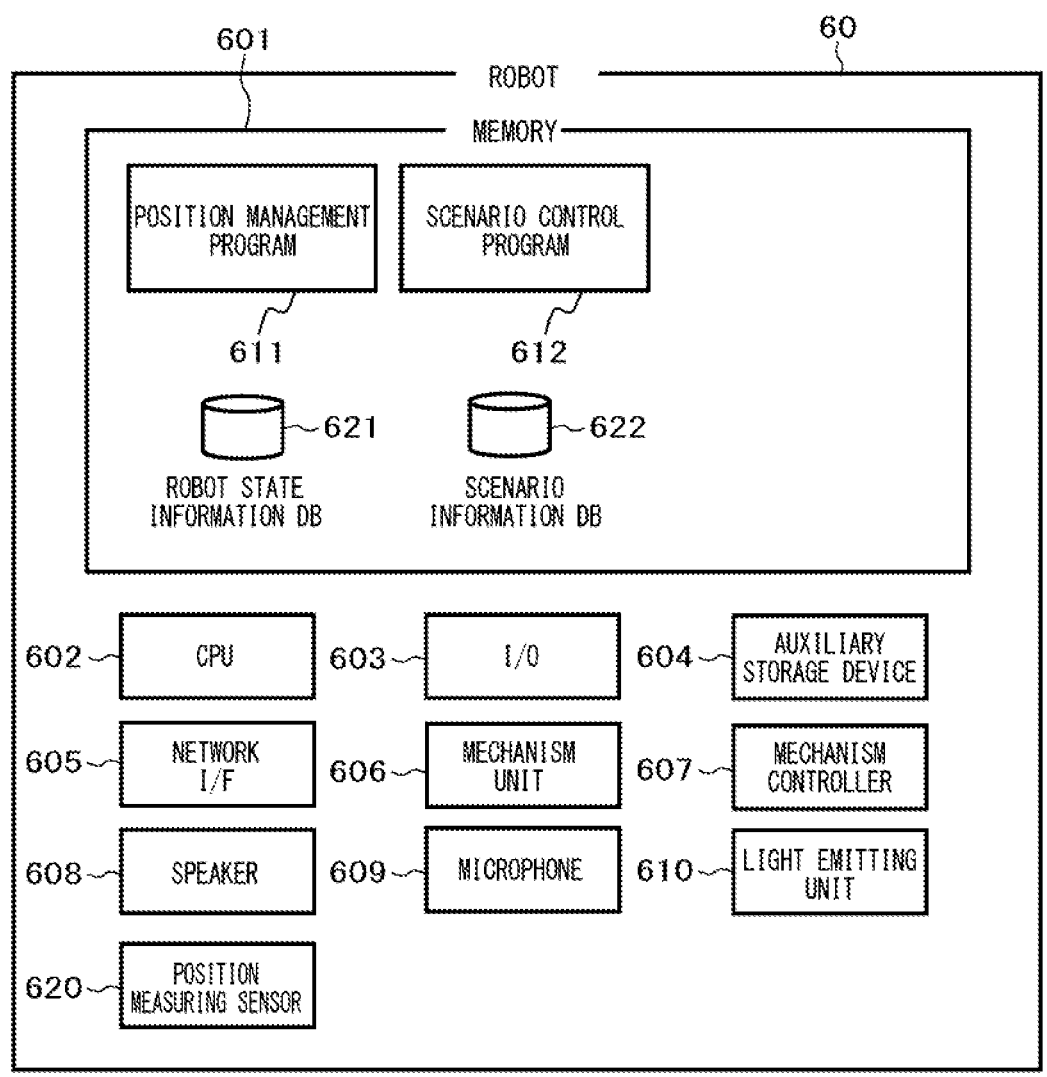
FIG. 17 is a diagram showing an example of the configuration of a robot.

FIG. 17 is a diagram showing an example of the configuration of a robot 60. In the robot 60, programs (software) are stored in an auxiliary storage device 604 for a general computer, and a CPU 602 loads the programs read from the auxiliary storage device 604 into a memory 601 and executes the programs. The robot 60 communicates with another device via an I/F 605. The robot 60 includes a mechanism unit 606 with mechanism portions of a head, arms, and legs of the robot, a mechanism controller 607 for controlling the mechanism unit 606, a speaker 608 for emitting a sound, a microphone 609 for collecting a sound, a light emitting unit 610, and a position measuring sensor 620 that is a distance measurer composed of a camera and a laser or the like.

An I/O 603 is a user interface that is used by a user to input an instruction to the external apparatus control server 30 and presents the results of executing the programs and the like to the user. The I/O 603 is connected to input and output devices (for example, a keyboard, a mouse, a touch panel, a display, a printer, and the like). The I/O 603 may be connected to a user interface to be provided by a management terminal connected via the network.

The CPU 602 is a processor that executes the programs stored in the memory 601. The memory 601 includes a ROM that is a nonvolatile storage element and a RAM that is a volatile storage element. The ROM stores an unchanged program (for example, a basic input output system (BIOS)) and the like. The RAM is a high-speed volatile storage element such as a DRAM and temporarily stores the programs stored in the auxiliary storage device 604 and data to used upon the execution of the programs.

Specifically, the memory 601 stores a position management program 611 and a scenario control program 612.

Figure 18:
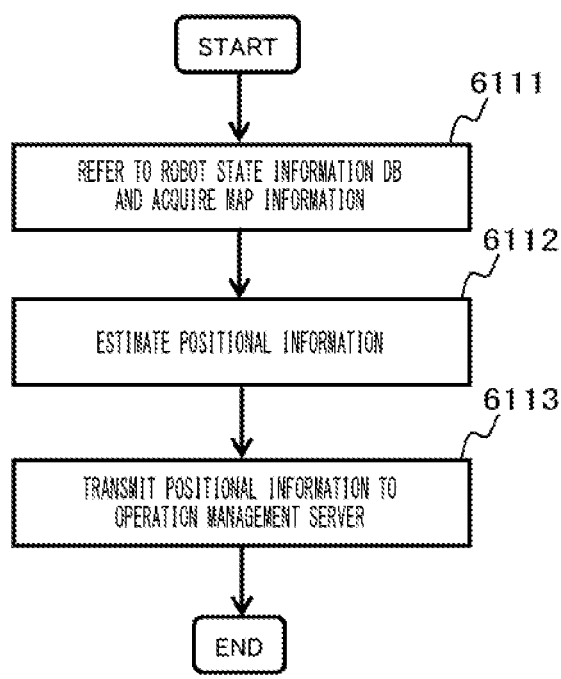
FIG. 18 is a flowchart showing an example of a position management process.

The position management program 611 is a program for executing a position management process (refer to FIG. 18). The scenario control program 612 is a program for executing a scenario control process (refer to FIG. 19).

The memory 601 stores a robot state information DB 621 (refer to FIG. 20) and a scenario information DB 622 (refer to FIG. 20).

The auxiliary storage device 604 is a large-capacity nonvolatile storage device such as a magnetic storage device (HDD) or a flash memory (SSD). In the auxiliary storage device 604, the programs to be executed by the CPU 602 and data to be used upon the execution of the programs are stored. Specifically, the programs are read from the auxiliary storage device 604, loaded into the memory 601, and executed by the CPU 602.

A computer system of the robot 60 is composed of a single physical computer or composed of a multiple logical or physical computers. The programs stored in the memory 601 may be executed with separate threads in the same computer or may be executed in a virtual computer built in multiple physical computer resources. All or a part of the processes achieved by the execution of the programs may be achieved by hardware (for example, an FPGA).

The aforementioned programs may be installed in the ROM or the like and provided or may be recorded as an installable or executable file in a computer-readable recording medium such as a CD-ROM, a CD-R, or a DVD and provided and distributed. The aforementioned programs may be stored in a computer connected to a network such as the Internet and may be downloaded via the network and provided and distributed.

FIG. 18 is a flowchart showing an example of the position management process. The position management process is executed by causing the CPU 602 of the robot 60 to execute the position management program 611.

First, the position management program 611 references the robot state information DB 621 and acquires the site map (in step 6111). Next, the position management program 611 executes self-localization based on the acquired site map and information acquired by the distance measuring sensor 620 and estimates the position of the robot 60 on the site map (in step 6112). Then, the position management program 611 transmits the estimated position as positional information of the robot 60 to the operation management server 10 (in step 6113) and terminates the process.

FIG. 19 is a flowchart showing an example of the scenario control process. The scenario control process is executed by causing the CPU 602 of the robot 60 to execute the scenario control program 612.

Upon receiving, from the service control server 20, a scenario start message to be used to execute a scenario for providing a service by the robot 60 (in step 6121), the scenario control program 612 references the scenario information DB 622 using a scenario identifier included in the scenario start message as a key (in step 6122) and executes scenario operations (scenario operations 1 to N) associated with the scenario identifier (in step 6123). When the execution of the scenario operations is terminated, the scenario control program 612 transmits a scenario end message including the scenario identifier to the service control server 20 (in step 6124).

FIG. 20 shows the structures of the various databases stored in the memory 601 of the robot 60. Since the robot state information DB 621 is a database that is the same as or similar to the robot state DB 121 shown in FIG. 9, a description of the robot state information DB 621 is omitted.

The scenario information DB 622 is a database to be used to manage information of a scenario of a service to be provided by the robot 60. As shown in FIG. 20, the scenario information DB 622 includes a scenario identifier uniquely identifying the scenario and information defining scenario operations (scenario operations 1 to N).

Figure 21:
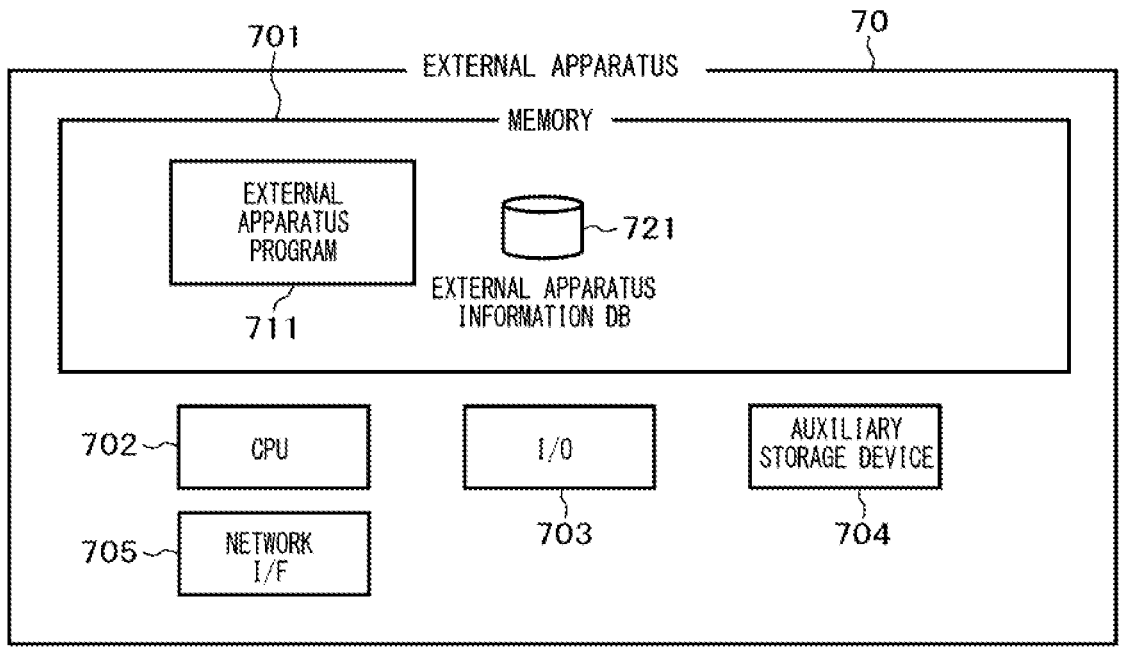
FIG. 21 is a diagram showing an example of the configuration of an external apparatus.

FIG. 21 is a diagram showing an example of the configuration of an external apparatus 70. In the external apparatus 70, a program (software) is stored in an auxiliary storage device 704 for a general computer, and a CPU 702 loads the program read from the auxiliary storage device 704 into a memory 701 and executes the program. The external apparatus 70 communicates with another server, the other external apparatuses, and the robots 60 via a network T/F 705.

An I/O 703 is a user interface that is used by a user to input an instruction to the external apparatus control server 30 and presents the result of executing the program and the like to the user. The I/O 703 is connected to input and output devices (for example, a keyboard, a mouse, a touch panel, a display, a printer, and the like). The I/O 703 may be connected to a user interface to be provided by a management terminal connected via the network.

The CPU 702 is a processor that executes the program stored in the memory 701. The memory 701 includes a ROM that is a nonvolatile storage element and a RAM that is a volatile storage element. The ROM stores an unchanged program (for example, a basic input output system (BIOS)) and the like. The RAM is a high-speed volatile storage element such as a DRAM and temporarily stores the program stored in the auxiliary storage device 704 and data to be used upon the execution of the program.

Specifically, the memory 701 stores an external apparatus program 711.

Figure 22:
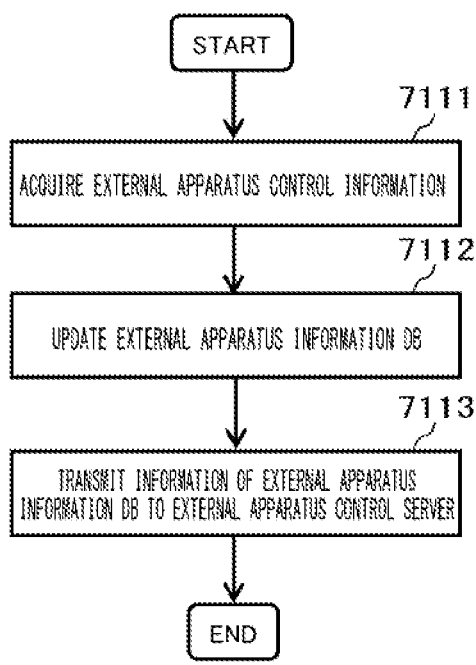
FIG. 22 is a flowchart showing an example of an external apparatus control process.

The external apparatus program 711 is a program for executing an external apparatus process (refer to FIG. 22).

The memory 701 stores an external apparatus information DB 721 (refer to FIG. 23).

The auxiliary storage device 704 is a large-capacity nonvolatile storage device such as a magnetic storage device (HDD) or a flash memory (SSD), for example. In the auxiliary storage device 704, the program to be executed by the CPU 702 and data to be used upon the execution of the program are stored. Specifically, the program is read from the auxiliary storage device 704, loaded into the memory 701, and executed by the CPU 702.

The external apparatus 70 is a computer system composed of a single physical computer or composed of multiple logical or physical computers. The program stored in the memory 701 may be executed with separate threads in the same computer or may be executed in a virtual computer built in multiple physical computer resources. The external apparatus 70 and another device may be installed in a single physical or logical computer. The entire process achieved by the execution of the program or a part of the process may be achieved by hardware (for example, an FPGA).

The aforementioned program may be installed in the ROM or the like and provided or may be recorded as an installable or executable file in a computer-readable recording medium such as a CD-ROM, a CD-R, or a DVD and provided and distributed. The aforementioned program may be stored in a computer connected to a network such as the Internet and may be downloaded via the network and provided and distributed.

FIG. 22 is a flowchart showing an example of the external apparatus control process. The external apparatus control process is executed by causing the CPU 702 of the external apparatus 70 to execute the external apparatus control program 711.

First, upon receiving the control information transferred from the external apparatus control server 30 in step 3113 and indicating the external apparatus 70 (in step 7111), the external apparatus control program 711 updates the external apparatus information DB 721 (in step 7112), transmits state information of the external apparatus information DB 721 after the update and an apparatus identifier associated with the state information to the external apparatus control server 30 (in step 7113), and terminates the process.

FIG. 23 shows the structure of the database stored in the memory 701 of the external apparatus 70.

The external apparatus information DB 721 is a database to be used to manage information of the external apparatus 70. As shown in FIG. 23, the external apparatus information DB 721 stores the same items as those of the external apparatus information DB 123 shown in FIG. 9 and the state information of the external apparatus 70. The state information indicates whether or not the external apparatus is available, for example. The state information is a signal indicating that the external apparatus in a busy state, for example.

FIG. 24 is a sequence diagram showing an example of a process to be executed for the execution of a service that requires a robot 60 and an external apparatus 70 to coordinate with each other. As shown in FIG. 24, in the case where the service control server 20 executes the service control program 211 and executes the service requiring the coordination with the external apparatus 70, the service control server 20 transmits a message requesting the coordination with the external apparatus to the operational management server 10 (in step 2401, FIG. 11).

Upon receiving the message requesting the coordination with the external apparatus, the operation management server 10 executes the external apparatus coordination program 111 (in step 2402, FIG. 3), executes the distance calculation program 112 (in step 2403, FIG. 4), executes the apparatus availability determination program 113 (in step 2404, FIG. 5), and executes the apparatus usage time period calculation program 114 (in step 2405, FIG. 6). The operation management server 10 transmits information of the available external apparatus 70 to the service control server 20. Upon receiving the information transmitted by the operation management server 10 and indicating the available external apparatus 70, the service control server 20 executes the service program 212 (in step 2406, FIG. 12) and transmits a control message including details of a scenario to be executed to the robot 60.

Upon receiving the control message from the service control server 20, the robot 60 executes the scenario control program 612 (in step 2407, FIG. 19) and transmits the control message indicating the external apparatus 70 to the external apparatus control server 30 upon the use of the external apparatus 70. Upon receiving the control message indicating the external apparatus 70 from the robot 60, the external apparatus control server 30 executes the external apparatus control program 311 (in step 2408, FIG. 16), starts controlling the external apparatus 70, and transmits the control message to the external apparatus 70. Upon receiving the control message from the external apparatus control server 30, the external apparatus 70 executes the external apparatus program 711 (in step 2409, FIG. 22) and executes an operation indicated in the control message.

FIG. 25 is a sequence diagram showing a process to be executed to update the external apparatus usage state DB 125 based on the state of a service using an external apparatus 70. As shown in FIG. 25, the robot 60 executes the scenario control program 612 (in step 2501, FIG. 19). When a scenario is terminated, the robot 60 transmits a message indicating the end of the scenario to the service control server 20. Upon receiving the message indicating the end of the scenario from the robot 60, the service control server 20 changes a service state (in step 2502, FIG. 11) and transmits service state information indicating the changed service state to the operation management server 10. Upon receiving the service state information from the service control server 20, the operation management server 10 executes the apparatus usage time period update program 116 (in step 2506, FIG. 8), calculates a scheduled usage time period for each service, and updates the external apparatus usage state DB 125.

According to the embodiment, in the case where a service that requires a robot and an external apparatus to coordinate with each other provided to a person, the service can be smoothly provided to the person by selecting the external apparatus based on a distance to the external apparatus and a usage state of the external apparatus.

The present invention is not limited to the aforementioned embodiment and includes various modified examples and equivalent configurations. For example, the embodiment is described in detail to easily explain the present invention and is not necessarily limited to all the configurations described above. In addition, a part of the configurations described in the embodiment may be replaced with another configuration. Furthermore, another configuration may be added to a part of the configurations described in the embodiment.

In addition, some or all of the processes by the aforementioned programs may be achieved by hardware, for example, by designing an integrated circuit, and a process to be executed by the hardware and a process to be executed by a program may be combined. The information such as the programs and the tables can be stored in a storage device such as a memory, an HDD, or an SSD or a recording medium such as an IC card, an SD card, or a DVD. In addition, control lines and information lines that are necessary for the above description are shown, while a control line and an information line other than the lines shown in the drawings may be provided.

What is claimed is:

1. A server device that controls an autonomously mobile information processing device, comprising:
   a distance calculator that calculates a distance between the information processing device and an apparatus based on positional information of the information processing device and positional information of the apparatus installed in a service provision site and necessary for a service to be provided by the information processing device;
   an availability determiner that determines the apparatus that is available based on the distance between the information processing device and the apparatus in a case where the information processing device coordinates with the apparatus to provide the service, and based on a scheduled time period to use the service and a time period for the movement;
   a usage time period calculator that calculates the time period for the movement of the information processing device to the apparatus based on the distance between the information processing device and the apparatus and a moving speed of the information processing device; and
   a priority determiner that determines that the apparatus is available if the availability determiner determines that the apparatus is not available and a priority of the service that is stored in association with the scheduled time period to use a service scheduled to be started is higher than a priority of the service that is stored in association with a scheduled time period to use a service being executed.

2. The server device according to claim 1, further comprising a usage time period updating section that calculates the scheduled time period to use the service based on service information storing a standard time period required for the service to be provided by the information processing device and updates the scheduled time period to use the service, which is stored for each apparatus.

3. The server device according to claim 2,
wherein the usage time period updating section determines whether the scheduled time period to use the service exceeds a wait limitation time defined for the information processing device, and the usage time period updating section causes the information processing device to stand by based on a result of the determination.

4. The server device according to claim 2,
wherein the usage time period updating section updates the scheduled time period to use the service in a service state indicating a current state and progress of the service.

5. The server device according to claim 3,
wherein the usage time period updating section provides an alternative function of the service if the scheduled time period to use the service exceeds the wait limitation time defined for the information processing device.

6. A device control method comprising:
calculating a distance between an autonomously mobile information processing device and an apparatus based on positional information of the information processing device and positional information of the apparatus installed in a service provision site and necessary for a service to be provided by the information processing device;
determining the apparatus that is available based on the distance between the information processing device and the apparatus in a case where the information processing device coordinates with the apparatus to provide the service, and based on a scheduled time period to use the service and the time period for the movement; and
calculating a time period for a movement of the information processing device to the apparatus based on the distance between the information processing device and the apparatus and a moving speed of the information processing device;
wherein in the determining, it is determined that the apparatus is available if it is determined that the apparatus is not available and a priority of the service that is stored in association with a scheduled time period to use a service scheduled to be started is higher than a priority of the service that is stored in association with a scheduled time period to use a service being executed.

7. The device control method according to claim 6, further comprising:
calculating the scheduled time period to use the service based on service information storing a standard time period required for the service to be provided by the information processing device and updating a scheduled time period to use the service, which is stored for each apparatus.

8. The device control method according to claim 7,
wherein in the updating, whether the scheduled time period to use the service exceeds a wait limitation time defined for the information processing device is determined, and the information processing device stands by based on a result of the determination.

9. The device control method according to claim 7,
wherein in the updating, the scheduled time period to use the service is updated in a service state indicating a current state and progress of the service.

10. The device control method according to claim 8,
wherein in the updating, an alternative function of the service is provided if the scheduled time period to use the service exceeds the wait limitation time defined for the information processing device.

11. A computer-readable recording medium storing a program for causing a computer to execute:
calculating a distance between an autonomously mobile information processing device and an apparatus based on positional information of the information processing device and positional information of the apparatus installed in a service provision site and necessary for a service to be provided by the information processing device;
determining the apparatus that is available based on the distance between the information processing device and the apparatus in a case where the information processing device coordinates with the apparatus to provide the service, and based on a scheduled time period to use the service and the time period for the movement; and
calculating a time period for a movement of the information processing device to the apparatus based on the distance between the information processing device and the apparatus and a moving speed of the information processing device;
wherein in the determining, it is determined that the apparatus is available if it is determined that the apparatus is not available and a priority of the service that is stored in association with a scheduled time period to use a service scheduled to be started is higher than a priority of the service that is stored in association with a scheduled time period to use a service being executed.

* * * * *